United States Patent
Iseri et al.

(10) Patent No.: US 12,273,638 B2
(45) Date of Patent: Apr. 8, 2025

(54) IMAGING DEVICE AND ELECTRONIC APPARATUS

(71) Applicant: SONY SEMICONDUCTOR SOLUTIONS CORPORATION, Kanagawa (JP)

(72) Inventors: Yuji Iseri, Kanagawa (JP); Hodaka Kira, Kanagawa (JP); Daisuke Hagihara, Kumamoto (JP); Kazuki Yoshida, Kumamoto (JP); Syo Yasunaga, Kumamoto (JP); Koji Yamaryo, Kumamoto (JP); Takeo Ono, Kanagawa (JP); Kimihiko Sato, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/773,172

(22) PCT Filed: Oct. 26, 2020

(86) PCT No.: PCT/JP2020/040148
§ 371 (c)(1),
(2) Date: Apr. 29, 2022

(87) PCT Pub. No.: WO2021/090727
PCT Pub. Date: May 14, 2021

(65) Prior Publication Data
US 2024/0155261 A1      May 9, 2024

(30) Foreign Application Priority Data
Nov. 7, 2019   (JP) .................... 2019-202415

(51) Int. Cl.
H04N 25/702    (2023.01)
H04N 25/13     (2023.01)

(52) U.S. Cl.
CPC .......... *H04N 25/702* (2023.01); *H04N 25/13* (2023.01)

(58) Field of Classification Search
CPC ...... H04N 25/702; H04N 25/13; H04N 23/12; H04N 25/131; H04N 25/704; H04N 25/706; G02B 5/20
See application file for complete search history.

(56) References Cited

U.S. PATENT DOCUMENTS 8,130,437 B2 *   3/2012   Hsiao .................. G02B 5/201
                                                   359/259
10,872,919 B2 * 12/2020   Takizawa ............ H04N 25/585
(Continued)

FOREIGN PATENT DOCUMENTS

CN   101995668 A   3/2011
CN   102710902 B   8/2016
(Continued)

OTHER PUBLICATIONS

International Search Report and Written Opinion prepared by the Japan Patent Office on Nov. 17, 2020, for International Application No. PCT/JP2020/040148, 2 pgs.

*Primary Examiner* — Antoinette T Spinks
(74) *Attorney, Agent, or Firm* — Sheridan Ross PC

(57) ABSTRACT

An imaging device according to the present disclosure includes the plurality of normal pixels arranged in a matrix, the special pixel arranged by replacing a part of the normal pixels, the color filter corresponding to the normal pixels and arranged according to a predetermined rule, the special filter arranged corresponding to the special pixel, and the special pixel color filter arranged to surround at least a part of the periphery of the special filter.

16 Claims, 24 Drawing Sheets

(56) References Cited

U.S. PATENT DOCUMENTS

| | | | |
|---|---|---|---|
| 11,322,534 B2 * | 5/2022 | Takizawa | H01L 27/14641 |
| 2005/0270594 A1 * | 12/2005 | Kobayashi | H01L 27/14627 |
| | | | 348/E9.01 |
| 2011/0134293 A1 | 6/2011 | Tanaka | |
| 2014/0346629 A1 * | 11/2014 | Naya | G02B 5/201 |
| | | | 257/432 |
| 2016/0301897 A1 | 10/2016 | Huang | |
| 2017/0201726 A1 | 7/2017 | Yorikado | |
| 2019/0019820 A1 * | 1/2019 | Takizawa | H04N 25/771 |

FOREIGN PATENT DOCUMENTS

| | | | | |
|---|---|---|---|---|
| CN | 110164898 A | * | 8/2019 | H01L 27/14621 |
| JP | 2008-312073 | | 12/2008 | |
| JP | 2010-233857 | | 10/2010 | |
| JP | 2016-009813 | | 1/2016 | |
| JP | 2016-201524 | | 12/2016 | |
| JP | 2018182397 A | | 11/2018 | |

* cited by examiner

IMAGING DEVICE AND ELECTRONIC APPARATUS

CROSS REFERENCE TO RELATED APPLICATIONS

This application is a national stage application under 35 U.S.C. 371 and claims the benefit of PCT Application No. PCT/JP2020/040148, having an international filing date of 26 Oct. 2020, which designated the United States, which PCT application claimed the benefit of Japanese Patent Application No. 2019-202415, filed 7 Nov. 2019, the entire disclosures of each of which are incorporated herein by reference.

FIELD

The present disclosure relates to an imaging device and an electronic apparatus.

BACKGROUND

In an imaging device using a complementary metal oxide semiconductor (CMOS) or the like, a special pixel such as a pixel for receiving infrared light or a pixel for detecting an image plane phase difference may be arranged by replacing a normal pixel. For example, there is known an imaging device in which pixels for detecting an image plane phase difference are arranged at predetermined intervals on a horizontal line of normal pixels arranged on an array (see, for example, Patent Literature 1).

CITATION LIST

Patent Literature

Patent Literature 1: JP 2008-312073 A

SUMMARY

Technical Problem

As in the above technology, when the special pixel replaces a normal pixel, for example, a filter (for example, in the case of a pixel for receiving infrared light, an infrared light filter) corresponding to the function of the special pixel is formed in the special pixel instead of a color filter. As described above, when there is a region where no color filter is formed in the pixel array unit, there is a possibility that the color filter cannot be formed in a desired shape due to the influence of such a region. If the color filter cannot be formed in a desired shape, the light receiving sensitivity of the normal pixel fluctuates, and the accuracy of the imaging device may decrease.

Therefore, the present disclosure provides an imaging device and an electronic apparatus capable of suppressing a decrease in accuracy.

Solution to Problem

According to the present disclosure, an imaging device is provided. The imaging device includes the plurality of normal pixels arranged in a matrix, the special pixel arranged by replacing a part of the normal pixels, the color filter corresponding to the normal pixels and arranged according to a predetermined rule, the special filter arranged corresponding to the special pixel, and the special pixel color filter arranged to surround at least a part of the periphery of the special filter.

DESCRIPTION OF EMBODIMENTS

Figure 1:
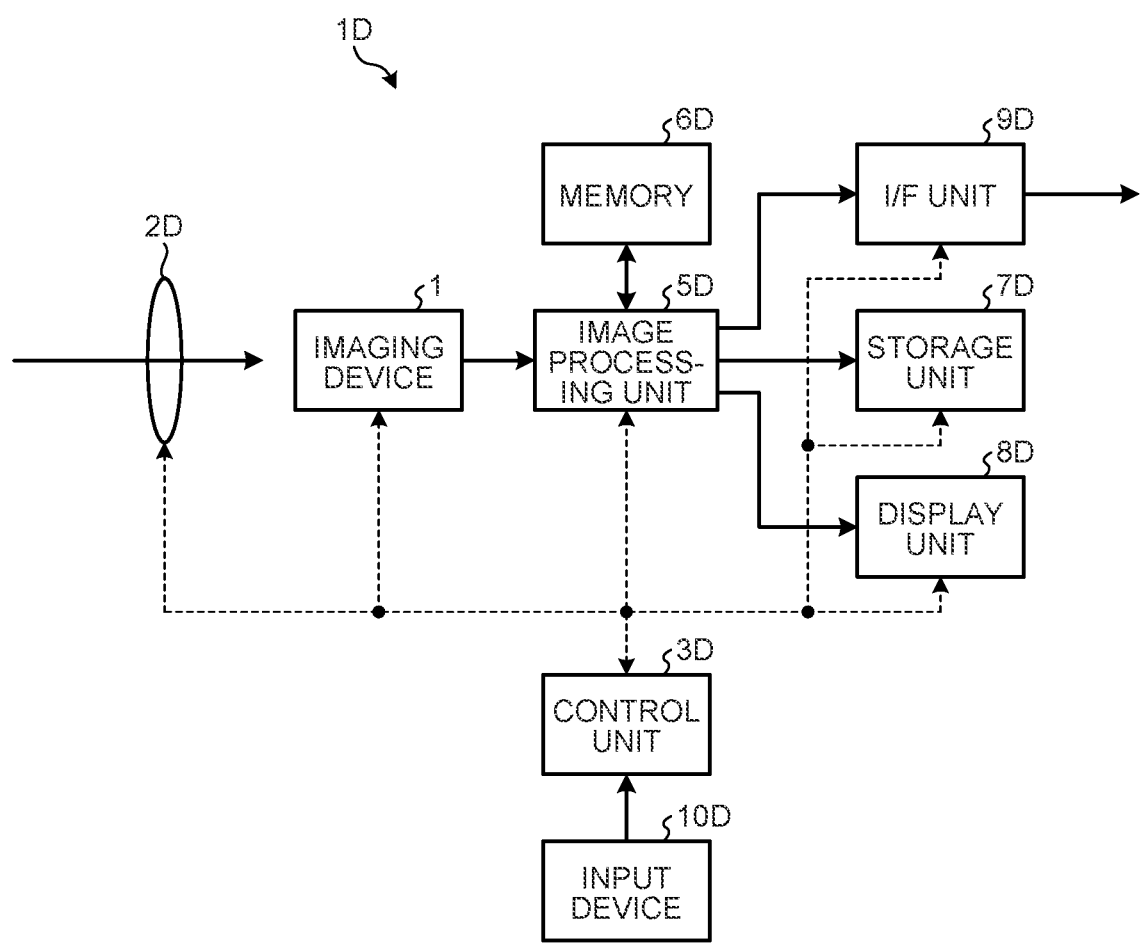
FIG. 1 is a block diagram illustrating a configuration of an example of an electronic apparatus that may be applied to an embodiment.

Hereinafter, preferred embodiments of the present disclosure will be described in detail with reference to the accompanying drawings. Note that, in the present specification and the drawings, components having substantially the same functional configuration are denoted by the same reference numerals, and redundant description is omitted. In addition, the size of each member in the drawings is appropriately emphasized for ease of description, and does not indicate actual dimensions and ratios between members.

Note that the description will be given in the following order.
1. Introduction
   1.1. Configuration examples applicable to embodiment
   1.2. Accuracy decrease in existing technology
2. Embodiment
   2.1. Configuration examples of color filter layer
   2.2. Effects of embodiment
3. Modifications
   3.1. First modification
   3.2. Second modification
   3.3. Third modification
   3.4. Fourth modification
   3.5. Fifth modification
4. Adaptation example

1. INTRODUCTION 1.1. Configuration Examples Applicable to Embodiment (Electronic Apparatus)

FIG. 1 is a block diagram illustrating a configuration of an example of an electronic apparatus that may be applied to an embodiment. In FIG. 1, an electronic apparatus 1D includes an optical system 2D, a control unit 3D, an imaging device 1, an image processing unit 5D, a memory 6D, a storage unit 7D, a display unit 8D, an interface (I/F) unit 9D, and an input device 10D.

Here, as the electronic apparatus 1D, a digital still camera, a digital video camera, mobile phone with an imaging function, a smartphone, or the like can be applied. In addition, as the electronic apparatus 1D, a monitoring camera, an in-vehicle camera, a medical camera, or the like can also be applied.

The imaging device 1 includes, for example, a plurality of photoelectric conversion elements arranged in a matrix array. The photoelectric conversion elements convert received light into electric charge by photoelectric conversion. The imaging device 1 includes a drive circuit that drives the plurality of photoelectric conversion elements, and a signal processing circuit that reads electric charge from each of the plurality of photoelectric conversion elements and generates image data based on the read electric charge.

The optical system 2D includes a main lens including one or a combination of a plurality of lenses and a mechanism for driving the main lens, and forms an image of image light (incident light) from a subject on a light receiving surface of the imaging device 1 via the main lens. In addition, the optical system 2D includes an autofocus mechanism that adjusts the focus in accordance with a control signal and a zoom mechanism that changes the zoom ratio in accordance with a control signal. In addition, in the electronic apparatus 1D, the optical system 2D may be detachable and may be replaced with another optical system 2D.

The image processing unit 5D executes predetermined image processing on the image data output from the imaging device 1. For example, the image processing unit 5D is connected to the memory 6D such as a frame memory, and writes the image data output from the imaging device 1 in the memory 6D. The image processing unit 5D executes predetermined image processing on the image data written in the memory 6D, and writes the image data subjected to the image processing again in the memory 6D.

The storage unit 7D is, for example, a non-volatile memory such as a flash memory or a hard disk drive, and stores the image data output from the image processing unit 5D in a non-volatile manner. The display unit 8D includes, for example, a display device such as a liquid crystal display (LCD) and a drive circuit that drives the display device, and can display an image based on the image data output from the image processing unit 5D. The I/F unit 9D is an interface for transmitting the image data output from the image processing unit 5D to the outside. For example, a universal serial bus (USB) can be applied as the I/F unit 9D. The present invention is not limited to this, and the I/F unit 9D may be an interface connectable to a network by wired communication or wireless communication.

The input device 10D includes an operator for receiving a user input. If the electronic apparatus 1D is, for example, a digital still camera, a digital video camera, a mobile phone or a smartphone with an imaging function, the input device 10D can include a shutter button for giving instructions on imaging by the imaging device 1 or an operator for realizing the function of the shutter button.

The control unit 3D includes, for example, a processor such as a central processing unit (CPU), a read only memory (ROM), and a random access memory (RAM), and controls the entire operation of the electronic apparatus 1D using the RAM as a work memory according to the program stored in the ROM in advance. For example, the control unit 3D can control the operation of the electronic apparatus 1D according to the user input received by the input device 10D. In addition, the control unit 3D can control the autofocus mechanism in the optical system 2D based on the image processing result of the image processing unit 5D.

(Imaging Device)

Figure 2:
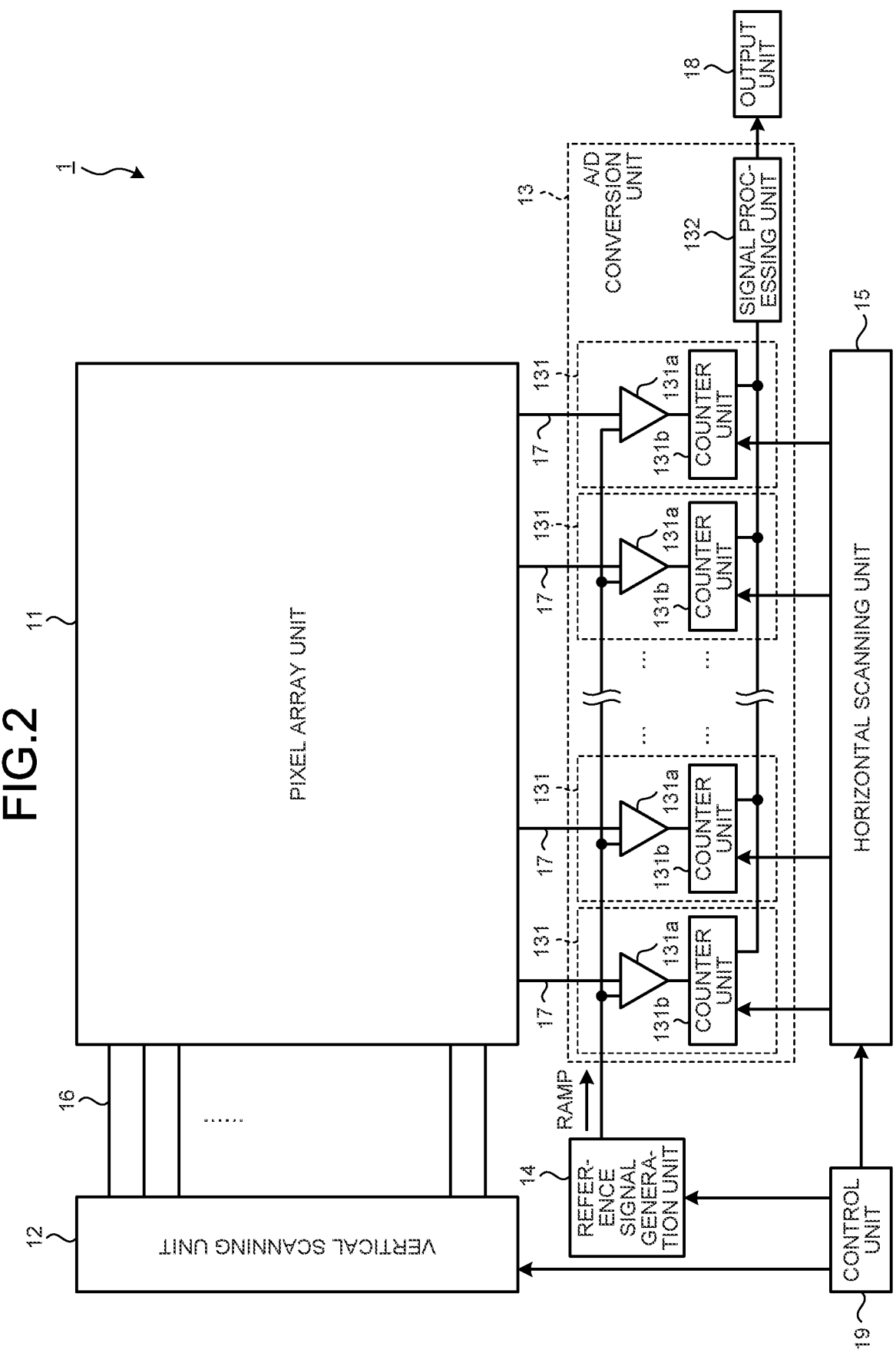
FIG. 2 is a block diagram illustrating a schematic configuration example of an imaging device that may be applied to an embodiment of the present disclosure.

FIG. 2 is a block diagram illustrating a schematic configuration example of an imaging device that may be applied to an embodiment of the present disclosure. In FIG. 2, the imaging device 1 includes a pixel array unit 11, a vertical scanning unit 12, an A/D conversion unit 13, a reference signal generation unit 14, a horizontal scanning unit 15, a pixel signal line 16, a vertical signal line 17, an output unit 18, and a control unit 19.

The pixel array unit 11 includes a plurality of pixels arranged in a two-dimensional matrix in a horizontal direction (row direction) and a vertical direction (column direction). Each pixel includes a photoelectric conversion unit that performs photoelectric conversion on received light. The photoelectric conversion unit includes a photodiode or the like.

In addition, to the pixel array unit 11, the pixel signal line 16 is connected for each row and the vertical signal line 17 is connected for each column. An end of the pixel signal line 16 that is not connected to the pixel array unit 11 is connected to the vertical scanning unit 12. The pixel signal line 16 transmits a control signal such as a drive pulse when a pixel signal is read from a pixel from the vertical scanning unit 12 to the pixel array unit 11. An end of the vertical signal line 17 that is not connected to the pixel array unit 11 is connected to the analog to digital (A/D) conversion unit 13. The vertical signal line 17 transmits the pixel signal read from the pixel to the A/D conversion unit 13

Under the control of the control unit 19, the vertical scanning unit 12 supplies various signals including a drive pulse to the pixel signal line 16 corresponding to the selected pixel row of the pixel array unit 11, outputting the pixel signal and the like to the vertical signal line 17. The vertical scanning unit 12 includes, for example, a shift register, an address decoder, and the like.

The A/D conversion unit 13 includes a column A/D conversion unit 131 provided for each vertical signal line 17 and a signal processing unit 132.

The column A/D conversion unit 131 executes a counting processing for a correlated double sampling (CDS) processing for performing noise reduction on the pixel signal output from the pixel via the vertical signal line 17. The column A/D conversion unit 131 includes a comparator 131a and a counter unit 131b.

The comparator 131a compares the pixel signal input from the pixel via the vertical signal line 17 with a ramp signal RAMP supplied from the reference signal generation unit 14 in a preset phase (P-phase) period, and outputs the comparison result to the counter unit 131b. Here, the P-phase period is a period in which the reset level of the pixel signal is detected in the CDS processing. In addition, the ramp signal RAMP is, for example, a signal in which the level (voltage value) decreases at a constant slope, or a sawtooth wave signal in which the level decreases stepwise. When the level of the ramp signal RAMP is higher than the level of the pixel signal, the comparator 131a outputs a high difference signal to the counter unit 131b. When the level of the ramp signal RAMP becomes equal to or lower than the level of the pixel signal, the comparator 131a inverts the output and outputs a low difference signal to the counter unit 131b. Note that the level of the ramp signal RAMP is reset to a predetermined value after the output of the comparator 131a is inverted.

In the P-phase period, according to the difference signal input from the comparator 131a, the counter unit 131b down-counts the time from the start of the voltage drop of the ramp signal RAMP to the level equal to or lower than that of the pixel signal, and outputs the counting result to the signal processing unit 132. In addition, in the data phase (D-phase) period, according to the difference signal input from the comparator 131a, the counter unit 131b up-counts the time from the start of the voltage drop of the ramp signal RAMP to the level equal to or lower than that of the pixel signal, and outputs the counting result to the signal processing unit 132. Here, the D-phase period is a detection period in which the signal level of the pixel signal is detected in the CDS processing.

The signal processing unit 132 performs CDS processing and A/D conversion processing based on the counting result of the P-phase period and the counting result of the D-phase period input from the counter unit 131b to generate digital image data, and outputs the digital image data to the output unit 18.

The reference signal generation unit 14 generates the ramp signal RAMP based on a control signal input from the control unit 19, and outputs the generated ramp signal RAMP to the comparator 131a of the A/D conversion unit 13. The reference signal generation unit 14 includes, for example, a D/A conversion circuit or the like.

Under the control of the control unit 19, the horizontal scanning unit 15 performs selective scanning for selecting each column A/D conversion unit 131 in a predetermined order, sequentially outputting the counting results temporarily held by each column A/D conversion unit 131 to the signal processing unit 132. The horizontal scanning unit 15 includes, for example, a shift register, an address decoder, and the like.

The output unit 18 performs predetermined signal processing on the image data input from the signal processing unit 132 and outputs the image data to the outside of the imaging device 1.

The control unit 19 performs drive control of the vertical scanning unit 12, the A/D conversion unit 13, the reference signal generation unit 14, the horizontal scanning unit 15, and the like. The control unit 19 includes, for example, a timing generator or the like. The control unit 19 generates various drive signals serving as references for the operations of the vertical scanning unit 12, the A/D conversion unit 13, the reference signal generation unit 14, and the horizontal scanning unit 15.

The imaging device 1 configured as described above is a column AD type complementary metal oxide semiconductor (CMOS) image sensor in which the column A/D conversion unit 131 is arranged for each column. Note that, although there is one A/D conversion unit 13 in FIG. 2, for example, two A/D conversion units 13 may be provided in the vertical direction of the pixel array unit 11, and the odd-numbered column and the even-numbered column of the pixel array unit 11 may be divided in the vertical direction to output pixel signals.

(Pixel Array Unit)

Figure 3:
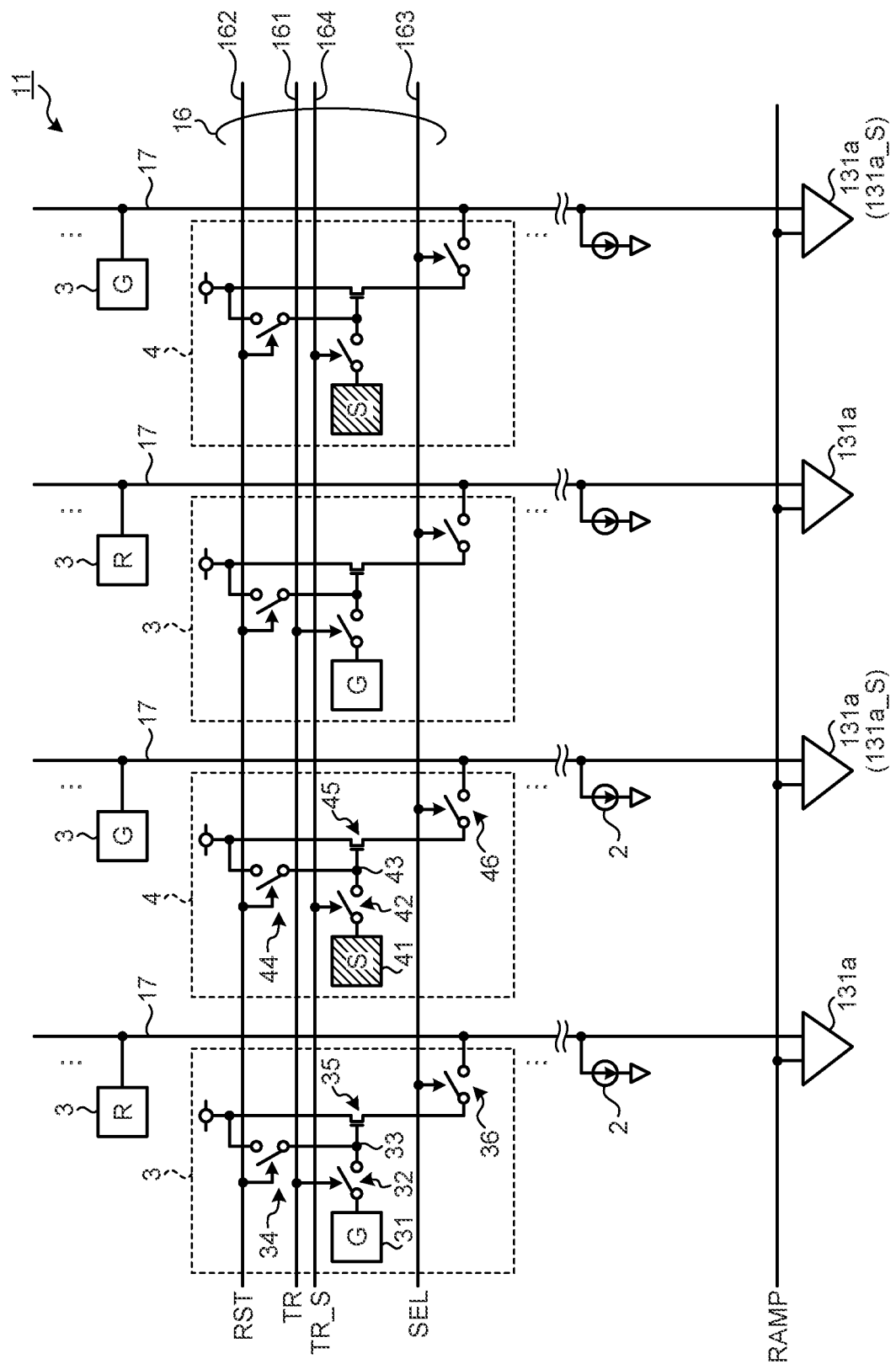
FIG. 3 is a diagram illustrating a part of a circuit configuration of a pixel array unit that may be applied to the embodiment.

FIG. 3 is a diagram illustrating a part of a circuit configuration of the pixel array unit 11 that may be applied to the embodiment.

As illustrated in FIG. 3, the pixel array unit 11 includes a constant current source 2, a pixel 3 (hereinafter, referred to as "normal pixel 3"), and a pixel 4 (hereinafter, referred to as "special pixel 4"). In the pixel array unit 11, a plurality of normal pixels 3 and a plurality of special pixels 4 are arranged in a two-dimensional matrix in a predetermined arrangement pattern, and the special pixels 4 are arranged in a predetermined pixel row at predetermined intervals. A first transmission signal line 161, a reset signal line 162, and a row selection signal line 163 are connected to each normal pixel 3 as the pixel signal line 16. In addition, the reset signal line 162, the row selection signal line 163, and a second transmission signal line 164 are connected to each special pixel 4 as the pixel signal line 16.

The constant current source 2 is provided in each vertical signal line 17. The constant current source 2 includes an N-channel MOS (metal-oxide-semiconductor field-effect) transistor (hereinafter, abbreviated as "NMOS") or the like. One end side of the constant current source 2 is grounded, and the other end side is connected to the vertical signal line 17.

The normal pixels 3 are arranged in a two-dimensional matrix on the pixel array unit 11. The normal pixel 3 includes a photoelectric conversion unit 31, a transfer switch 32, a floating diffusion 33 (hereinafter, abbreviated as "FD33"), a reset switch 34, an amplification transistor 35, and a row selection switch 36.

The photoelectric conversion unit 31 performs photoelectric conversion on the received light to generate signal electric charge for images. The photoelectric conversion unit 31 includes a PN junction photodiode or the like. The photoelectric conversion unit 31 has an anode terminal grounded and a cathode terminal connected to the FD33 via the transfer switch 32. In the embodiment, the photoelectric conversion unit 31 functions as a first photoelectric conversion unit.

The transfer switch 32 has one end connected to the photoelectric conversion unit 31 and the other end connected to the FD33. Further, the transfer switch 32 is connected to the first transmission signal line 161. When the transfer pulse TR is supplied via the first transmission signal line 161, the transfer switch 32 is turned on (closed state), and transfers the signal electric charge photoelectrically converted by the photoelectric conversion unit 31 to the FD33.

The FD33 temporarily holds the signal electric charge transferred from the photoelectric conversion unit 31 and converts the signal electric charge into voltage corresponding to the electric charge amount.

The reset switch 34 has one end connected to the FD33 and the other end connected to the power source voltage. Further, the reset switch 34 is connected to the reset signal line 162. In a case where the reset pulse RST is supplied via the reset signal line 162, the reset switch 34 is turned on, and discharges the electric charge of the FD33 to the power source voltage to reset the potential of the FD33 to predetermined potential.

One end of the amplification transistor 35 is connected to a power source voltage, and the other end is connected to the row selection switch 36. Further, the FD33 is connected to the gate end of the amplification transistor 35. The amplification transistor 35 functions as a source follower together with the constant current source 2 connected via the vertical signal line 17. The amplification transistor 35 outputs a reset signal (reset level) indicating a level corresponding to the potential of the FD33 reset by the reset switch 34 to the vertical signal line 17. In addition, the amplification transistor 35 outputs, to the vertical signal line 17, an image pixel signal indicating a level corresponding to the electric charge amount of the signal electric charge held in the FD33 after the signal electric charge is transferred from the photoelectric conversion unit 31 by the transfer switch 32.

The row selection switch 36 has one end connected to the amplification transistor 35 and the other end connected to the vertical signal line 17. Further, the row selection switch 36 is connected to the row selection signal line 163. When the row selection signal SEL is supplied from the row selection signal line 163, the row selection switch 36 is turned on, and outputs a reset signal or a pixel signal (first signal) output from the amplification transistor 35 to the vertical signal line 17.

One end of the vertical signal line 17 is connected to the comparator 131a or 131a_S of the A/D conversion unit 13. In the example of FIG. 3, the comparator 131a connected to the vertical signal line 17 to which the special pixel 4 is connected is illustrated as a comparator 131a_S.

The transfer switch 32, the reset switch 34, the amplification transistor 35, and the row selection switch 36 of the normal pixel 3 configured as described above include, for example, an NMOS or P-channel MOS transistor (abbreviated as PMOS). In addition, the normal pixel 3 includes any one color filter of a red (R) filter, a green (G) filter, and a blue (B) filter stacked on the light receiving surface of the photoelectric conversion unit 31. The normal pixels 3 form, for example, a Bayer array on the pixel array unit 11.

Note that the normal pixels 3 are not limited to the Bayer array, and may be arranged according to a predetermined rule. For example, it is possible to use various color filter arrays as a base such as an X-Trans (registered trademark) type color filter array having a unit pattern of 3×3 pixels, a quad-Bayer array having 4×4 pixels, and a white RGB type color filter array having 4×4 pixels including a color filter (hereinafter, also referred to as clear or white) having a broad light transmission characteristic with respect to a visible light region in addition to the color filters of the three primary colors of RGB.

In the following description, the photoelectric conversion unit 31 in which a green (G) filter is stacked on the light receiving surface will be referred to as a pixel G, the photoelectric conversion unit 31 in which a red (R) filter is stacked on the light receiving surface will be referred to as a pixel R, and the photoelectric conversion unit 31 in which a blue (B) filter is stacked on the light receiving surface will be referred to as a pixel B.

(Arrangement Example of Pixels)

Figure 4:
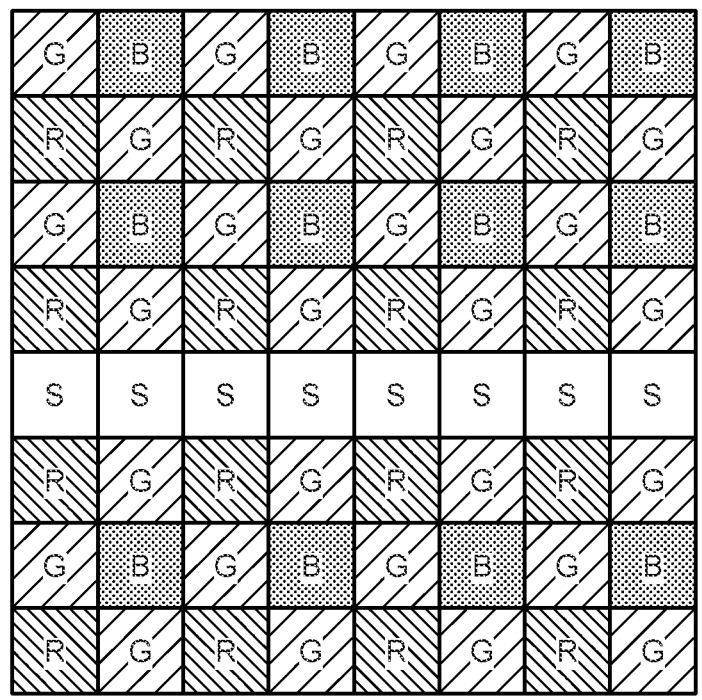
FIG. 4 is a diagram for explaining an arrangement example of pixels.

FIG. 4 is a diagram for explaining an arrangement example of pixels. As illustrated in FIG. 4, regarding the normal pixels 3, in a unit pixel of 2×2 pixels, two pixels at diagonal positions are the pixels G, and the remaining pixels are the pixels R and the pixels B. In FIG. 4, a part of the normal pixels 3 arranged according to the Bayer array is further replaced with special pixels 4 (pixels S). More specifically, in the normal pixels 3, the horizontal line in which the pixels B and pixels G are arranged is replaced with the special pixels 4.

The special pixel 4 has a configuration similar to that of the normal pixel 3, and includes a photoelectric conversion unit 41, a transfer switch 42, a floating diffusion 43 (hereinafter, simply referred to as "FD43"), a reset switch 44, an amplification transistor 45, and a row selection switch 46. The special pixel 4 includes a special filter stacked on the light receiving surface of the photoelectric conversion unit 41. In addition, in the special pixel 4, the transfer switch 42 is connected to the second transmission signal line 164, and the transfer pulse TR_S is supplied from the second transmission signal line 164. Other configurations of the special pixel 4 are similar to those of the normal pixel 3.

The special pixel 4 is a pixel other than a pixel (normal pixel, for example, the pixel R, the pixel G, and the pixel B) for acquiring color information and luminance information in the visible light region in order to form a full-color image. Examples of the special pixel 4 include an infrared light pixel, a white pixel, a monochrome pixel, a black pixel, a polarization pixel, and an image plane phase difference pixel. In the infrared light pixel, an infrared filter capable of receiving infrared light is stacked on the light receiving surface of the photoelectric conversion unit 41. In the white pixel, a white filter capable of receiving all visible light of red, green, and blue is stacked on the light receiving surface of the photoelectric conversion unit 41. In the monochrome pixel, a transparent filter is stacked on the light receiving surface of the photoelectric conversion unit 41. In the black pixel, a light shielding filter is stacked on the light receiving surface of the photoelectric conversion unit 41. The polarizing pixel is a pixel using a polarizing element for receiving polarized light.

In the image plane phase difference pixel, an opening filter opened only in a predetermined region is stacked on the light receiving surface of the photoelectric conversion unit 41. More specifically, as the image plane phase difference pixel, two pixels of a pixel in which an opening filter having an opening in a region of, for example, ½ on the left side of the light receiving surface of the photoelectric conversion unit 41 is stacked and a pixel in which an opening filter having an opening in a region of ½ on the right side of the light receiving surface of another photoelectric conversion unit 41 is stacked are set as one set, and distance measurement is performed based on a phase difference of light received by these two pixels.

As described above, the pixel signal having light received by the special pixel 4 photoelectrically converted can realize a function different from that of the pixel signal having light received by the normal pixel 3 photoelectrically converted. Note that, in the drawings, the special pixel 4 or the photoelectric conversion unit 41 of the special pixel 4 is represented as "S".

(Reading Method)

Figure 5:
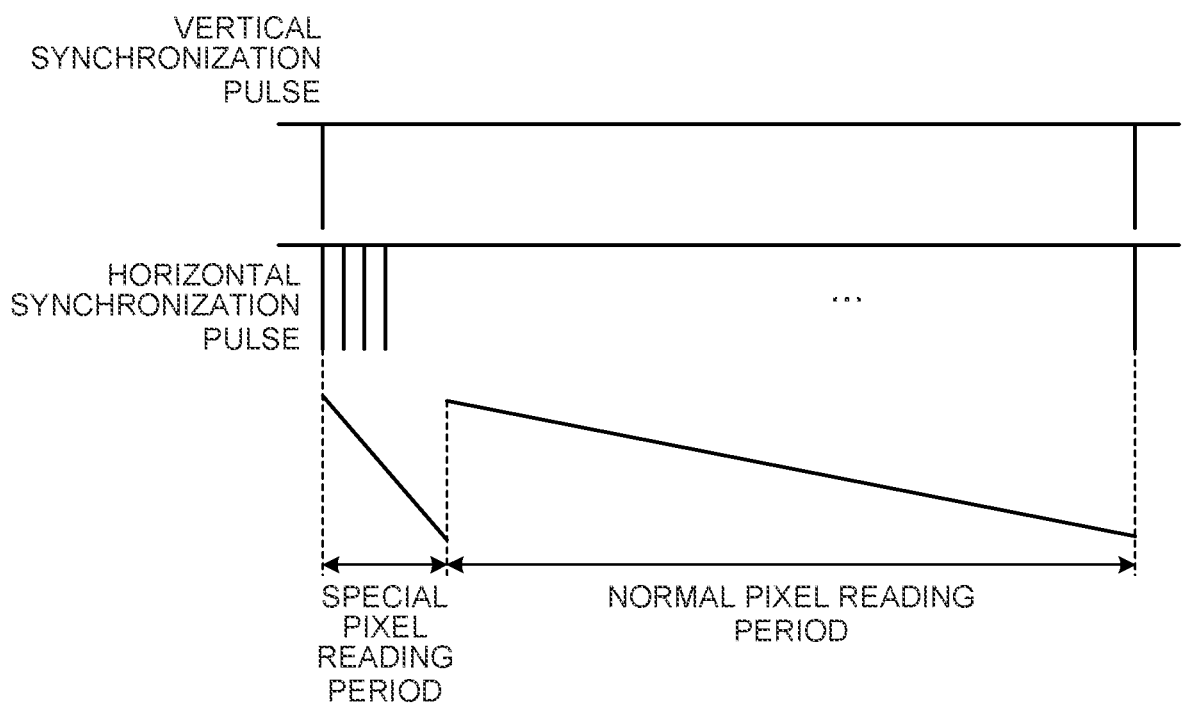
FIG. 5 is a timing chart schematically illustrating reading of a pixel signal by the imaging device.

Next, a method of reading the pixel signal in the above-described imaging device 1 will be described. FIG. 5 is a timing chart schematically illustrating reading of a pixel signal by the imaging device 1. In FIG. 5, the horizontal axis represents time. In addition, in FIG. 5, the output timing of the vertical synchronization pulse is illustrated in the upper part, and the output timing of the horizontal synchronization pulse in the vertical scanning unit 12 is illustrated in the middle part. FIG. 5 illustrates a case where the imaging device 1 reads pixel signals of one frame.

As illustrated in FIG. 5, the control unit 19 first sequentially reads pixel signals from the special pixels 4 of the pixel array unit 11 according to, for example, a vertical synchronization pulse and a horizontal synchronization pulse input from the outside of the imaging device 1. After reading the pixel signals from the special pixels 4 of all the special pixel rows, the control unit 19 sequentially reads the pixel signals from each normal pixel 3 for each row of the pixel array unit 11.

As described above, for example, the imaging device 1 first reads the pixel signals from all the special pixels 4, and then performs a reading method of sequentially reading the pixel signals from each normal pixel 3 for each row of the pixel array unit 11.

1.2. Accuracy Decrease in Existing Technology

Figure 6:
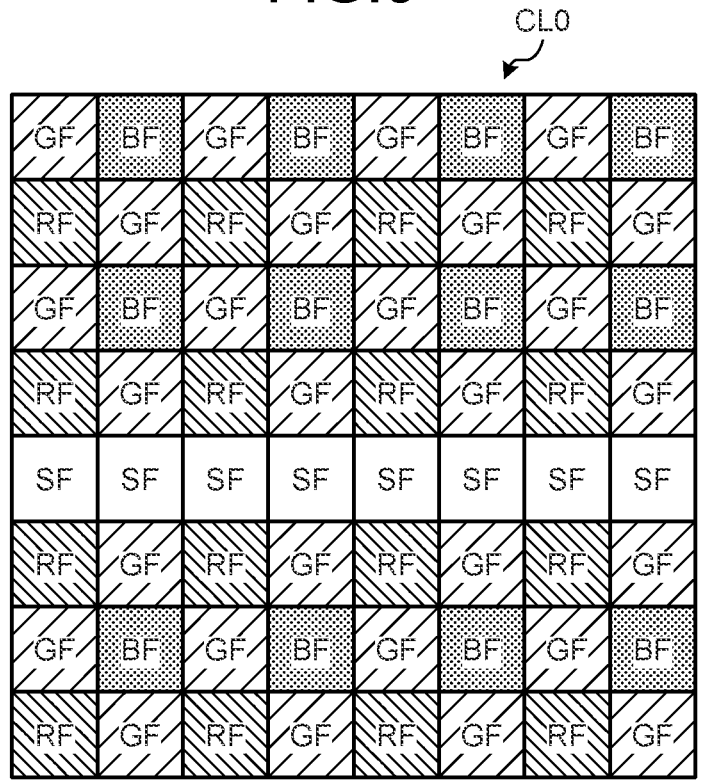
FIG. 6 is a diagram illustrating a configuration example of color filters.
Figure 7:
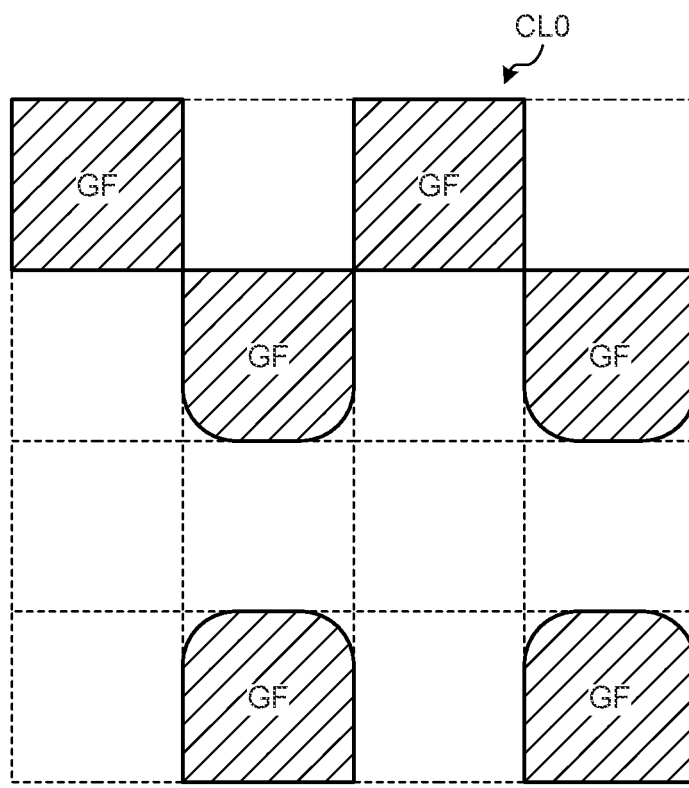
FIG. 7 is a diagram for explaining an example of a method of forming color filters.
Figure 8:
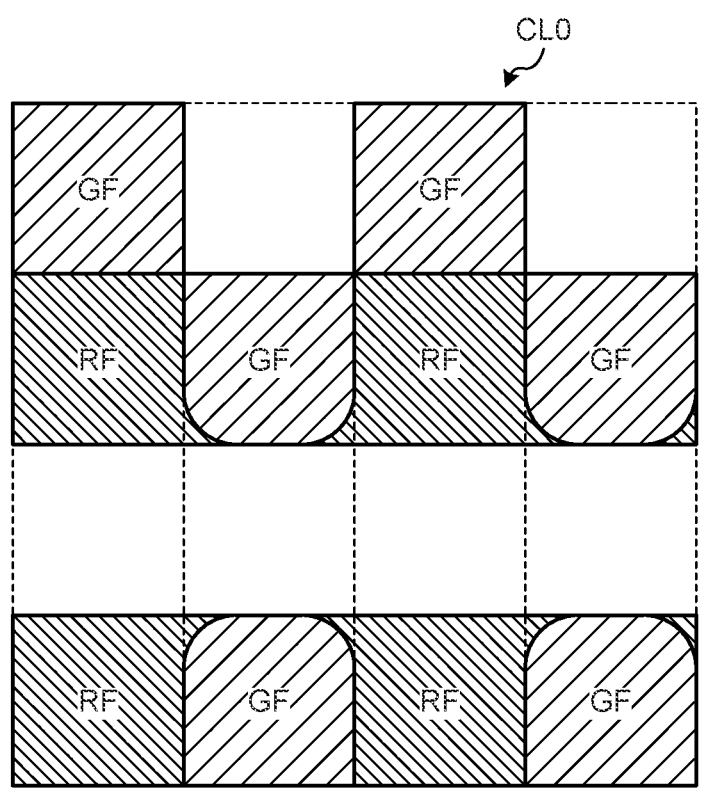
FIG. 8 is a diagram for explaining an example of a method of forming color filters.

Next, a decrease in imaging accuracy of the imaging device according to the existing technology will be described with reference to FIGS. 6 to 8. FIG. 6 is a diagram illustrating a configuration example of a color filter layer. FIGS. 7 and 8 are diagrams for explaining an example of a method of forming color filters.

Note that the green color filter formed corresponding to the pixel G is referred to as a green filter GF. The red color filter formed corresponding to the pixel R is referred to as a red filter RF. The blue color filter formed corresponding to the pixel B is referred to as a blue filter BF. When the green filter GF, the red filter RF, and the blue filter BF are not distinguished, they are also simply referred to as a color filter CF. In addition, the special filter formed corresponding to the pixel S (special pixel 4) is referred to as a special filter SF.

In the following description, the color filter CF and the special filter SF are provided for each of the normal pixel 3 and the special pixel 4. That is, although one color filter CF or special filter SF is provided in each pixel, for example, two or more adjacent special filters SF may be integrally formed, and the same type of adjacent filters may be integrally formed.

As described above, since the normal pixels 3 are arranged according to the Bayer array, as illustrated in FIG. 6, the color filters CF formed in a color filter layer CL0 are also arranged according to the Bayer array similarly to the normal pixels 3. In addition, the special filters SF are arranged by replacing a part (for example, a pixel row) of the color filters CF arranged according to the Bayer array.

Note that the special filter SF is a filter formed according to the function of the special pixel 4, and examples include the above-described white filter, a transparent filter, and an opening filter opened only in a predetermined region.

In this manner, it is assumed that the color filter layer in which the color filter CF and the special filter SF are arranged is formed in the order of the green filter GF, the red filter RF, and the blue filter BF, for example. In this case, as illustrated in FIG. 7, first, the green filter GF is formed on the pixel array unit 11.

Here, the color filter CF has a problem that it is difficult to form a corner portion that is not in contact with another color filter CF at a right angle. Therefore, as illustrated in FIG. 7, since the corner portion of the green filter GF adjacent to the region where the special filter SF is formed is an end that is not in contact with another green filter GF, the corner portion does not form a right angle and is rounded. Note that FIG. 7 is an enlarged view of a part of the color filter layer CL0 illustrated in FIG. 6, and a boundary line of pixels is indicated by a dotted line.

Next, when the red filter RF is formed after the green filter GF is formed, as illustrated in FIG. 8, a part of the red filter RF adjacent to the region where the special filter SF is formed protrudes to a region where the green filter GF is originally to be formed. Note that FIG. 8 is an enlarged view of a part of the color filter layer CL0 illustrated in FIG. 6, and a boundary line of pixels is indicated by a dotted line.

As described above, since a part of the red filter RF is formed in the region where the green filter GF is to be formed, there is a possibility that the light receiving sensitivity of the pixel G fluctuates and the imaging accuracy of the imaging device 1 decreases.

In addition, in the red filter formation region where the special filter SF is not formed, the red filter RF is formed in a region having four sides surrounded by the green filter GF on all sides. On the other hand, in the red filter formation region adjacent to the special filter SF, the red filter RF is formed in a region surrounded by the green filter GF on three sides. Therefore, as illustrated in FIG. 8, the red filter RF is formed to protrude to the formation region of the special filter SF, and the sensitivity of the pixel R may fluctuate. Since the red filter RF protrudes to the formation region of the special filter SF in this manner, there is a possibility that the film thickness of the red filter RF becomes uneven.

As described above, since the film thickness of the red filter RF becomes uneven, the light receiving sensitivity of the pixel R varies, and the imaging accuracy of the imaging device 1 may decrease.

Therefore, in the imaging device 1 according to the embodiment, the color filter CF is formed in the region where the special filter SF is formed to surround at least a part of the periphery of the special filter SF, suppressing a decrease in the imaging accuracy of the imaging device 1. Such points will be described below.

2. EMBODIMENT

2.1. Configuration Examples of Color Filter Layer

Figure 9:
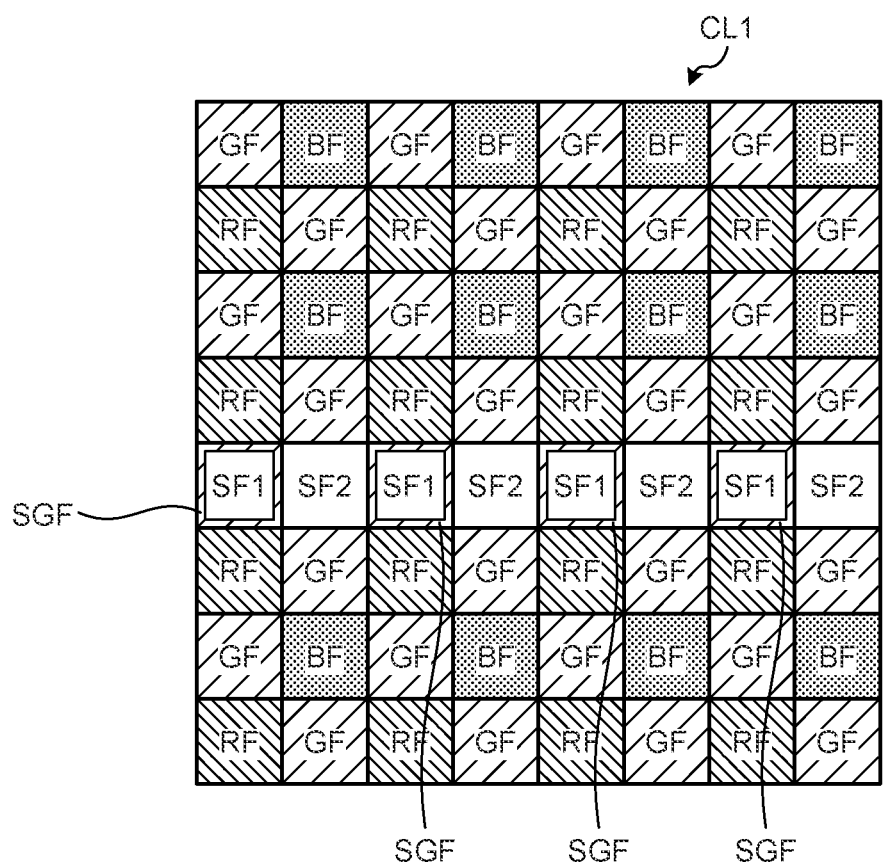
FIG. 9 is a diagram for explaining a color filter layer of the imaging device according to the embodiment.
Figure 10:
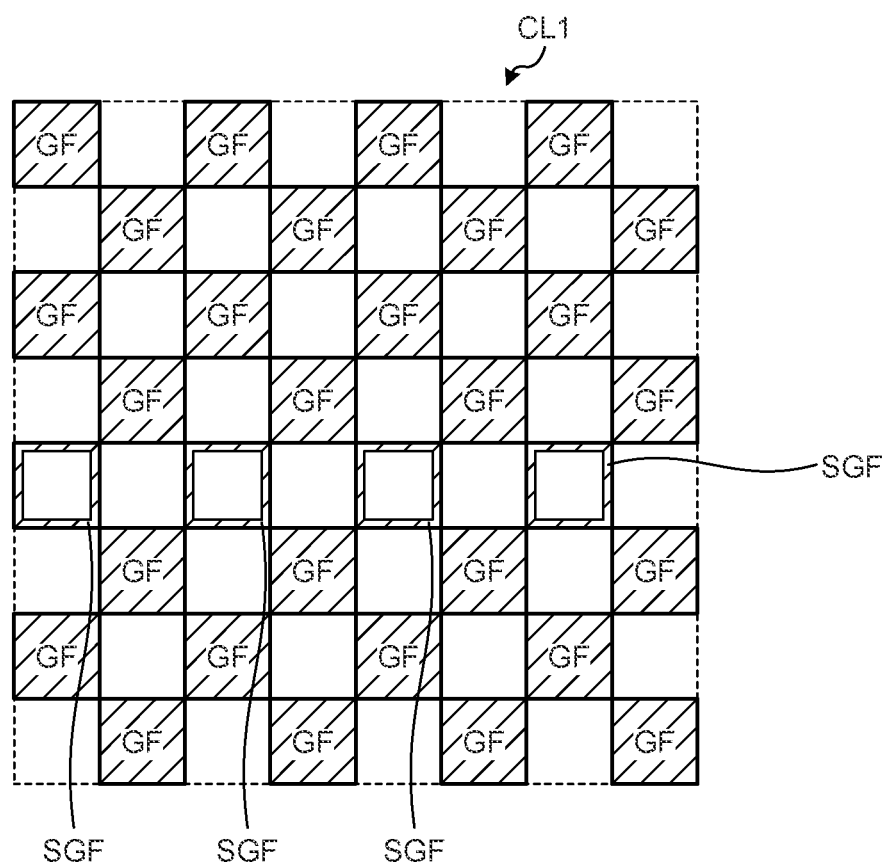
FIG. 10 is a diagram for explaining the color filter layer of the imaging device according to the embodiment.

FIGS. 9 and 10 are diagrams for explaining the color filter layer of the imaging device 1 according to the embodiment. The color filter layer CL1 illustrated in FIG. 9 has the same configuration as the color filter layer CL0 illustrated in FIG. 6 except that the periphery of some special filters SF is surrounded by a color filter (hereinafter, also referred to as a special pixel color filter SCF). Note that, although FIG. 9 illustrates a case where the special filters SF are arranged in one pixel row since a part of the color filter layer CL1 is illustrated, the special filters SF may be arranged in a plurality of pixel rows at predetermined intervals.

The color filter layer CL1 includes a special pixel color filter SGF surrounding the periphery of the special filter SF in plan view. Although FIG. 9 illustrates a case where the special pixel color filter SCF is a green filter (hereinafter, referred to as a special pixel green filter SGF) that passes through green, the special pixel color filter SCF may be a red filter or a blue filter.

As illustrated in FIG. 9, a special filter (hereinafter, also referred to as a first special filter SF1) surrounded by the special pixel green filter SGF and a special filter (hereinafter, also referred to as a second special filter SF2) not surrounded by the special pixel green filter SGF are alternately arranged for each pixel to form one pixel row.

FIG. 10 is a diagram illustrating the green filter GF and the special pixel green filter SGF among the filters formed in the color filter layer CL1 illustrated in FIG. 9. As illustrated in FIG. 10, the special pixel green filter SGF is arranged to surround the periphery of the special filter SF adjacent to the color filter CF (the red filter RF in FIG. 9) other than the green filter GF.

Figure 11:
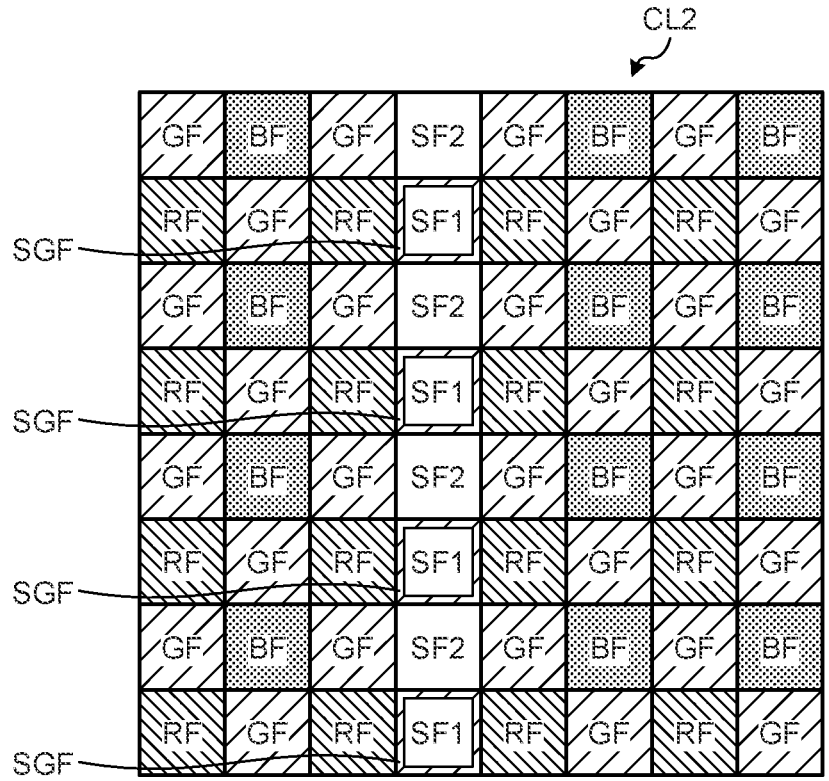
FIG. 11 is a diagram for explaining another configuration example of a color filter layer of the imaging device according to the embodiment.
Figure 12:
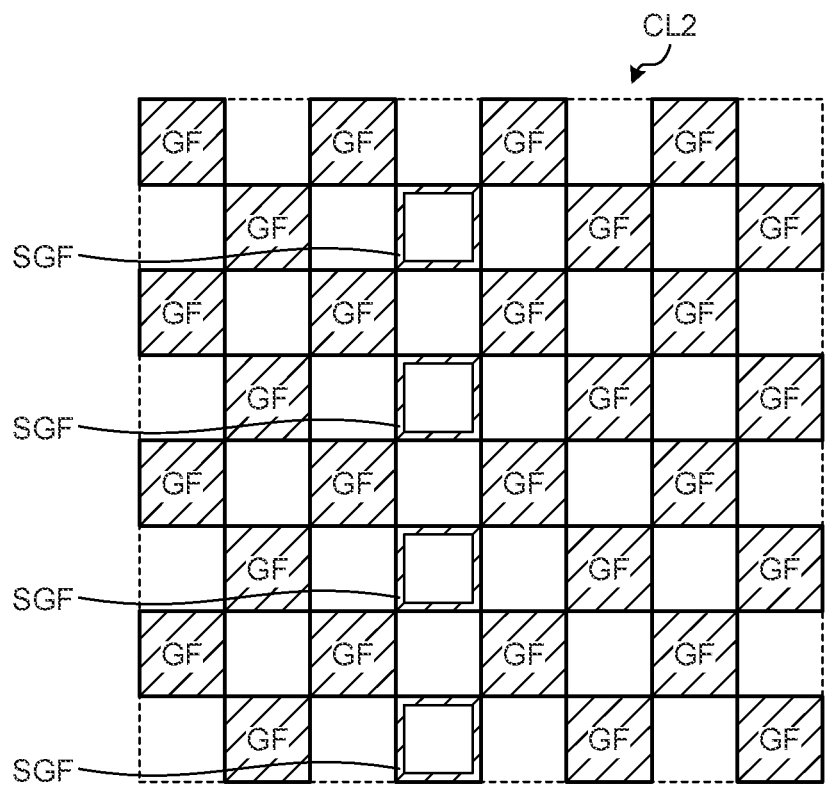
FIG. 12 is a diagram for explaining another configuration example of the color filter layer of the imaging device according to the embodiment.

Here, in FIGS. 9 and 10, an example in which the special pixels 4 and the special filters SF are arranged in a predetermined pixel row has been described, but the present invention is not limited to this. For example, as illustrated in FIGS. 11 and 12, the special pixels 4 and the special filters SF may be arranged in a predetermined pixel column. FIGS. 11 and 12 are diagrams for explaining another configuration example of a color filter layer of the imaging device 1 according to the embodiment.

As illustrated in FIG. 11, the special filters SF of a color filter layer CL2 are arranged in one pixel row. In addition, the first special filter SF1 adjacent to the red filter RF is surrounded by the special pixel green filter SGF. On the other hand, the second special filter SF2 adjacent to the green filter GF is not surrounded by the special pixel green filter SGF. Note that, although FIG. 11 illustrates a case where the special filters SF are arranged in one pixel row since a part of the color filter layer CL1 is illustrated, the special filters SF may be arranged in a plurality of pixel rows at predetermined intervals.

FIG. 12 is a diagram illustrating the green filter GF and the special pixel green filter SGF among the filters formed in the color filter layer CL2 illustrated in FIG. 11. As illustrated in FIG. 12, the special pixel green filter SGF is arranged to surround the periphery of the special filter SF adjacent to the color filter CF (the red filter RF in FIG. 11) other than the green filter GF.

Figure 13:
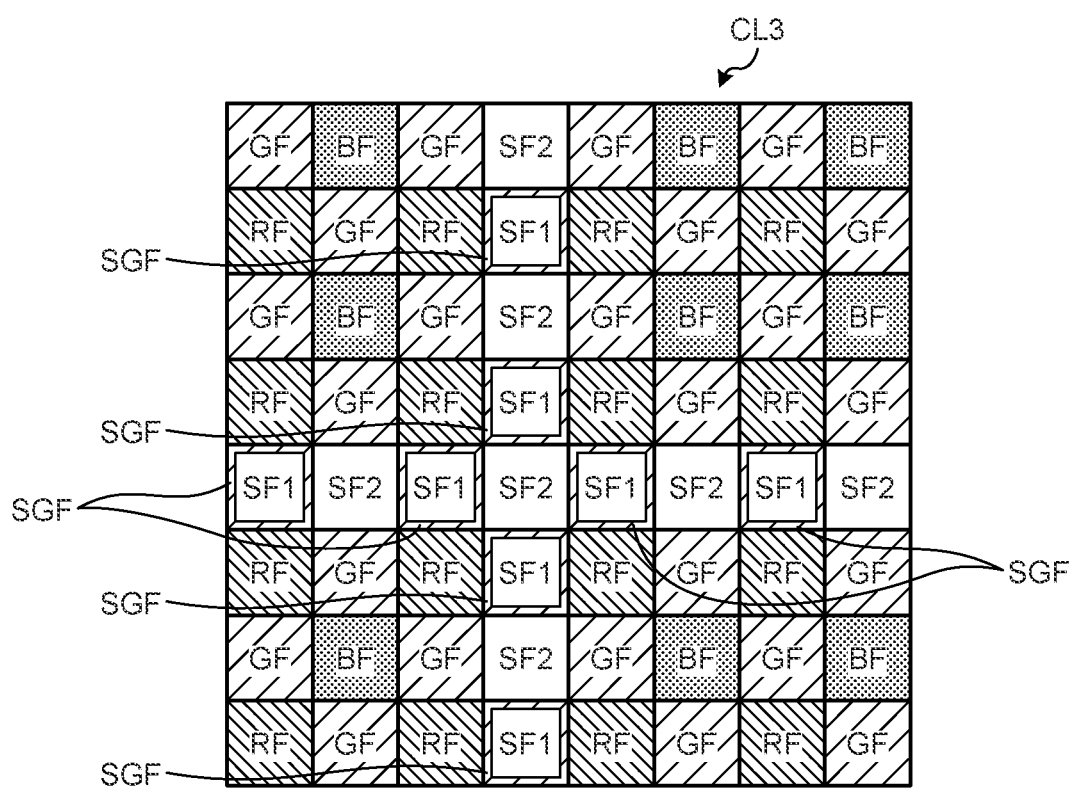
FIG. 13 is a diagram for explaining another configuration example of a color filter layer of the imaging device according to the embodiment.

Alternatively, as illustrated in FIG. 13, the special pixels 4 and the special filters SF may be arranged in both the pixel row and the pixel column. FIG. 13 is a diagram for explaining another configuration example of a color filter layer of the imaging device 1 according to the embodiment. FIG. 13 illustrates the green filter GF and the special pixel green filter SGF among the filters formed in the color filter layer CL2. Note that, although FIG. 13 illustrates a case where the special filters SF are arranged in one pixel row and one pixel column since a part of the color filter layer is illustrated, the special filters SF may be arranged in a plurality of pixel rows or a plurality of pixel columns at predetermined intervals.

2.2. Effects of Embodiment

As illustrated in FIGS. 9 to 13, the special pixel green filters SGF are arranged in a region where the pixels G are arranged in the Bayer array before replacement with the special pixels 4. In other words, the first special filter SF1 is formed inside while leaving the periphery of the green filter GF. Therefore, the corner portion of the green filter GF is arranged in contact with the corner portion of another green filter GF (including the special pixel green filter SGF).

As a result, the green filter GF has a corner portion in contact with another green filter even in the region where the special filter SF is formed, and an end not in contact with another green filter is not formed. Therefore, the corner portion of the green filter GF adjacent to the region where the special filter SF is formed can be formed in a desired shape, and the adjacent red filter RF can be formed without protruding to the region where the green filter GF is formed. Therefore, the color filter CF can be formed in a desired shape, a decrease and variation in the light receiving sensitivity of each pixel can be suppressed, and a decrease in the imaging accuracy of the imaging device 1 can be suppressed.

In addition, by forming the special pixel green filter SGF, four sides of the red filter RF adjacent to the formation region of the special filter SF can also be surrounded by the green filter GF including the special pixel green filter SGF, similarly to the other red filters RF. As a result, similarly to the other red filters RF, the red filter RF adjacent to the formation region of the special filter SF can also be made less likely to be formed with an uneven film thickness. Such points will be described with reference to FIGS. 14 to 17.

Figure 14:
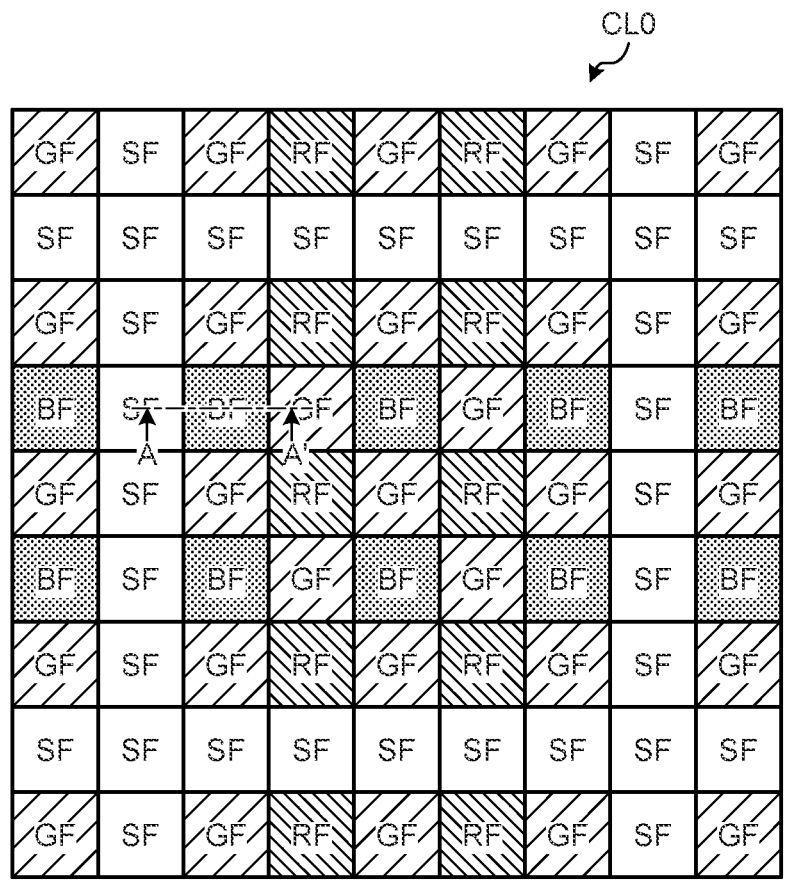
FIG. 14 is a diagram illustrating a configuration example of a color filter layer according to an existing technology.
Figure 15:
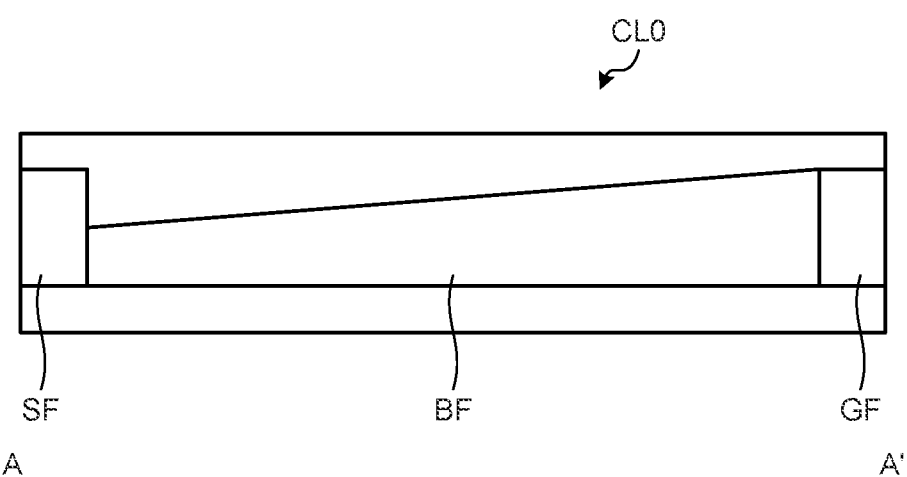
FIG. 15 is a schematic view illustrating a cross section of the color filter layer taken along line A-A' in FIG. 14.
Figure 16:
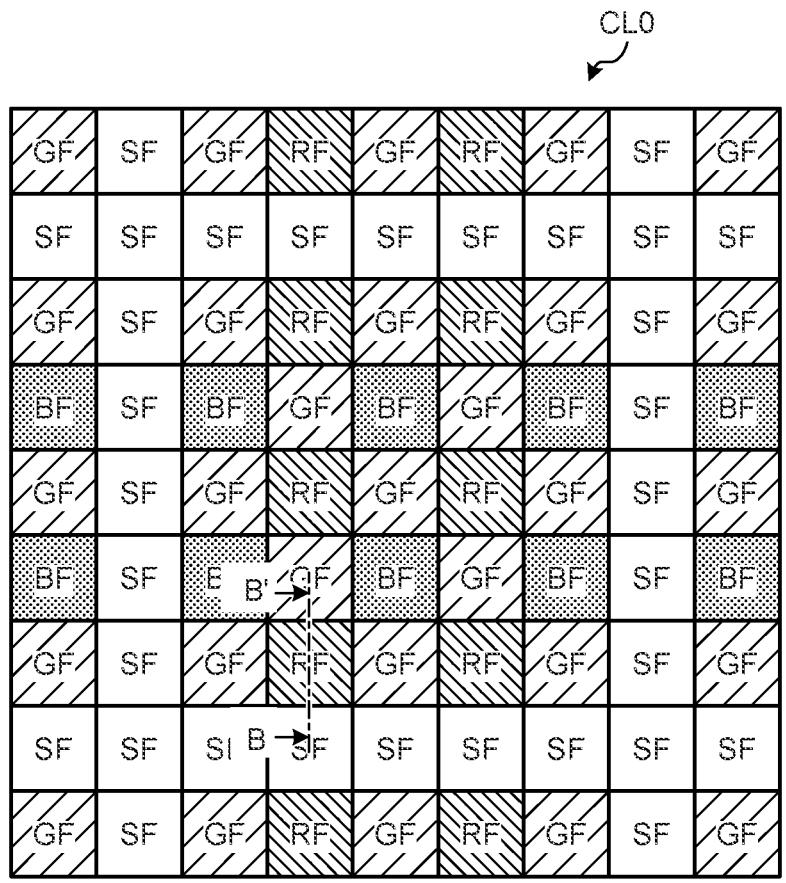
FIG. 16 is a diagram illustrating a configuration example of the color filter layer according to the embodiment.
Figure 17:
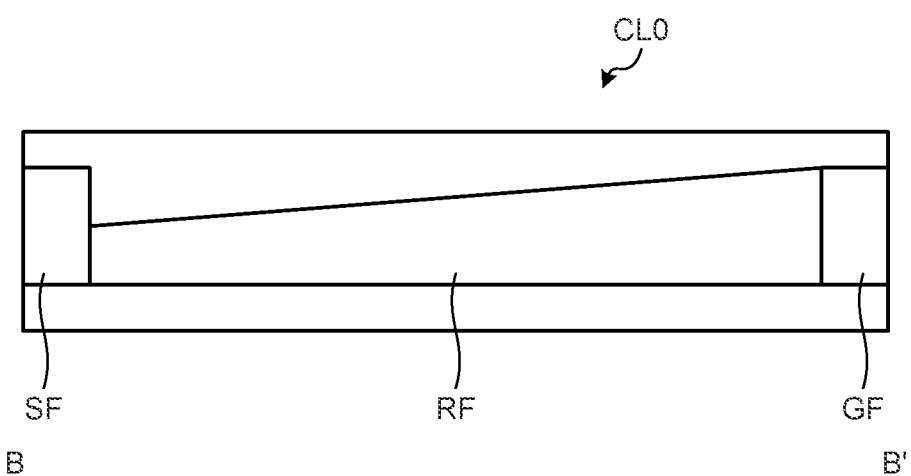
FIG. 17 is a schematic view illustrating a cross section of the color filter layer taken along line B-B' in FIG. 16.

FIG. 14 is a diagram illustrating a configuration example of a color filter layer according to an existing technology. FIG. 15 is a schematic view illustrating a cross section of the color filter layer taken along line A-A' in FIG. 14. FIG. 16 is a diagram illustrating a configuration example of the color filter layer according to the embodiment. FIG. 17 is a schematic view illustrating a cross section of the color filter layer taken along line B-B' in FIG. 16.

The color filter layer CL0 illustrated in FIGS. 14 and 16 does not include the special pixel color filter SGF, and the red filters RF and the blue filters BF are arranged in contact with the special filter SF. As illustrated in FIGS. 14 and 16, the special filters SF may be arranged in both the pixel row and the pixel column at predetermined intervals. FIGS. 14 and 16 are diagrams illustrating a part of the color filter layer CL0.

As illustrated in FIG. 14, the red filter RF and the blue filter BF adjacent to the special filter SF are surrounded by the green filter GF on three sides, and the other side is opened without being surrounded by the green filter GF.

As described above, for example, it is assumed that the color filters CF are formed in the order of green, red, and blue. In this case, for example, as illustrated in FIGS. 10 and 12, first, the green filters GF and the special pixel green filters SGF are formed, and then, the red filters RF and the blue filters BF are formed.

For example, in the case of forming the blue filter BF, the green filter GF becomes a wall on three sides surrounded by the green filter GF, but since there is no green filter GF as a wall on one side opened, the blue filter BF easily flows to the one side opened.

Therefore, as illustrated in FIG. 15, in the blue filter BF, the film thickness on the special filter SF side becomes thinner than the film thickness on the green filter GF side, and the film thickness becomes uneven.

Similarly, in the color filter layer CL0 according to the embodiment illustrated in FIG. 16, the red filter RF and the blue filter BF adjacent to the special filter SF are surrounded by the green filter GF on three sides, and the other side is opened without being surrounded by the green filter GF.

As described above, for example, it is assumed that the color filters CF are formed in the order of green, red, and blue. In this case, for example, as illustrated in FIGS. 10 and 12, first, the green filters GF and the special pixel green filters SGF are formed, and then, the red filters RF and the blue filters BF are formed.

For example, in the case of forming the red filter RF, the green filter GF becomes a wall on three sides surrounded by the green filter GF, but since there is no green filter GF as a wall on one side opened, the red filter RF easily flows to the one side opened.

Therefore, as illustrated in FIG. 17, in the red filter RF, the film thickness on the special filter SF side becomes thinner than the film thickness on the green filter GF side, and the film thickness becomes uneven.

On the other hand, in the color filter layer according to the present embodiment, the special pixel green filter SGF is formed to surround the periphery of the special pixel region. Therefore, the red filter RF and the blue filter BF are formed in a region having four sides surrounded by the green filter GF including the special pixel green filter SGF.

For example, in the case of forming the blue filter BF, the blue filter BF is formed by using the four sides green filters GF as walls. Therefore, in the blue filter BF, the difference between the film thickness on the special filter SF side and the film thickness on the green filter GF side becomes small, and the film can be evenly formed as compared with FIG. 15.

Note that, here, the description has been made on the point that the unevenness of the film thickness can be suppressed using the blue filter BF as an example, but the same effect can be obtained also for the red filter RF. In addition, the unevenness of the film thickness of the special filter SF can also be improved.

For example, in the examples of FIGS. 14 and 16, the special filters SF are arranged corresponding to a pixel row (also referred to as a special pixel row) and a pixel column (also referred to as a special pixel column). Here, if the special pixel color filter SGF is not formed, the film thickness of the special filter SF at the central portion of the special pixel row becomes thinner than the film thickness on both end sides. This is because the special filter SF flows to both end sides of the special pixel row (or the special pixel column) by the centrifugal force of the coater that forms the special filter SF.

As described above, since the film thickness of the special filter SF becomes uneven, the sensitivity of the special pixel 4 fluctuates, and the function corresponding to the special pixel 4 decreases. For example, it is assumed that the special pixel 4 is an image plane phase difference pixel, and the imaging device 1 realizes an autofocus function using the special pixel 4. In this case, when the sensitivity of the special pixel 4 fluctuates, the imaging device 1 cannot appropriately adjust the focus, and the autofocus function may decrease.

On the other hand, as illustrated in FIGS. 9 to 13, when the special pixel color filter SGF is formed in the special pixel row (or the special pixel column), for example, the special filter SF is divided for each pixel by the special pixel color filter SGF. Therefore, the special pixel color filter SGF serves as a wall, and the special filter SF hardly flows to both end sides of the special pixel row (or the special pixel column), in a manner that the unevenness of the film thickness of the special filter SF can be improved. As a result, it is possible to suppress functional degradation of the imaging device 1.

3. MODIFICATION

3.1. First Modification

In the above-described embodiment, the case where the special pixel green filter SGF is formed to surround the periphery of the special filter SF has been described, but the present invention is not limited to this. The special pixel green filter SGF may be formed to surround at least a part of a special pixel region SR including at least one of the special pixels 4. Such points will be described with reference to FIG. 18.

Figure 18:
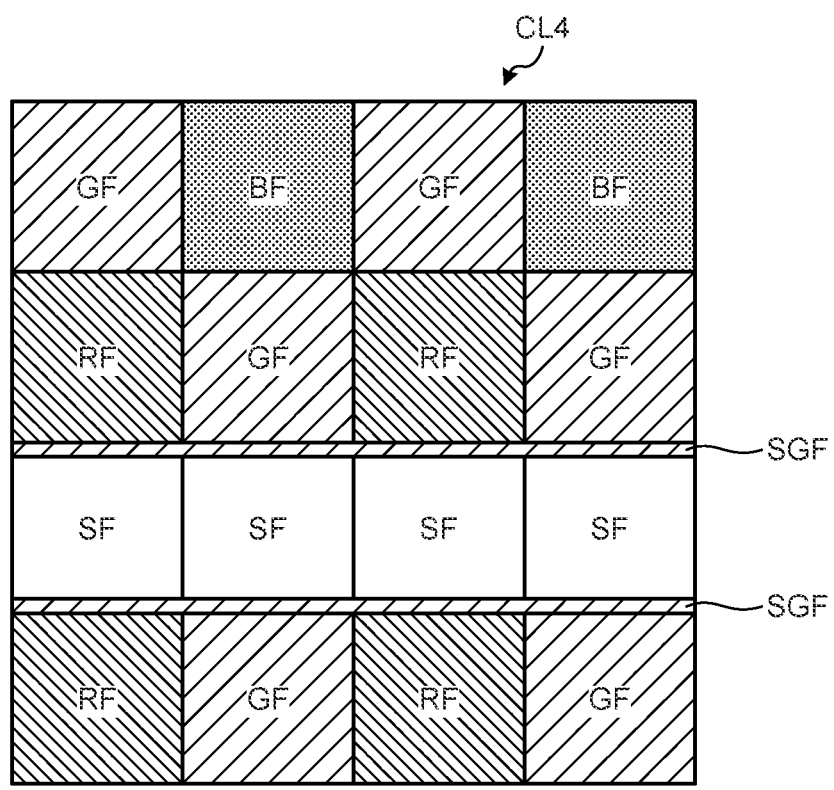
FIG. 18 is a diagram illustrating a configuration example of a color filter layer according to a first modification of the embodiment.

FIG. 18 is a diagram illustrating a configuration example of a color filter layer according to a first modification of the embodiment. Note that FIG. 18 illustrates a part of the color filter layer of the imaging device 1.

In a color filter layer CL4 illustrated in FIG. 18, the special pixel green filter SGF is formed on at least a part (a side in contact with the color filter CF) of the special filter SF.

As a result, the corner portion of the green filter GF comes into contact with another green filter GF or the special pixel green filter SGF, and the color filter CF can be formed in a desired shape. In addition, the unevenness of the film thickness of the color filter CF can be improved.

Note that, in the example illustrated in FIG. 18, the special filter SF is not divided by the special pixel green filter SGF. Therefore, for example, when evenness of the film thickness of the special filter SF is required, it is desirable to form the special pixel green filter SGF to surround the periphery of the special filter SF as illustrated in the color filter layers CL1 to CL3 in the embodiment. As a result, the special filter SF can be divided by the special pixel green filter SGF, and the unevenness of the film thickness of the special filter SF can be improved.

3.2. Second Modification

Figure 19:
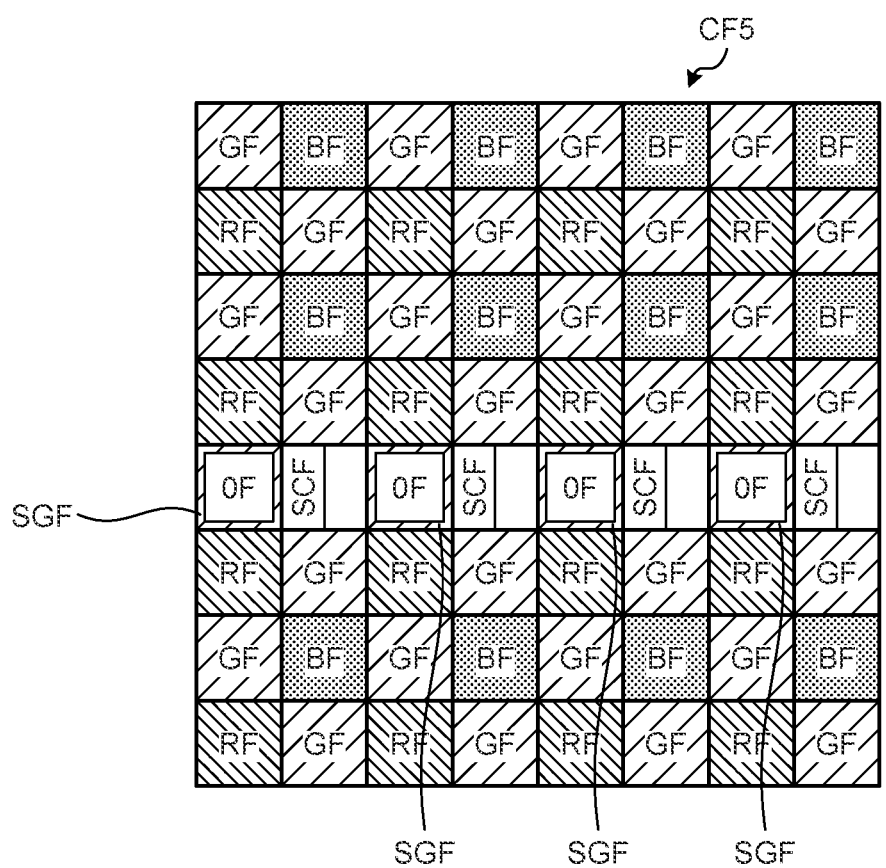
FIG. 19 is a diagram illustrating a configuration example of a color filter layer according to a second modification of the embodiment.

Next, a second modification of the embodiment will be described with reference to FIG. 19. FIG. 19 is a diagram illustrating a configuration example of a color filter layer CL5 according to the second modification of the embodiment. Note that FIG. 19 illustrates a part of the color filter layer CL5 of the imaging device 1.

As described above, in a case where the special pixel 4 is an image plane phase difference pixel, the special filter SF corresponding to the special pixel 4 is an opening filter opened only in a predetermined region, but all the special filters SF are not necessarily opening filters. For example, as illustrated in FIG. 19, a part of the special filter SF may be an opening filter, and another special filter SF may be a color filter that passes through a predetermined color. In this case, the color filter formed in the opening of the opening filter may be a color filter that passes through the same color as another special filter SF (hereinafter, also referred to as a special color filter SCF).

In the example of FIG. 19, an opening filter OF and the special color filter SCF are alternately arranged. The special color filter SCF is, for example, a color filter (hereinafter, also referred to as a cyan filter) that passes through cyan. Since cyan has higher sensitivity in the photoelectric conversion unit 41 than RGB, the sensitivity of the special pixel 4 can be improved by using the cyan filter as the special filter SF. Note that the special color filter SCF may be a white filter that passes through white instead of a cyan filter. Since the white filter has higher sensitivity in the photoelectric conversion unit 41 than the cyan filter, the sensitivity of the special pixel 4 can be further improved.

The special pixel green filter SGF is arranged to surround the periphery of the special color filter SCF. As a result, effects similar to those of the embodiment can be obtained. In addition, in the special pixel region where the special pixel green filter SGF is formed, the formation region of the special filter SF becomes small. Therefore, when the opening filter OF is formed in the special pixel region where the special pixel green filter SGF is formed, the sensitivity of the image plane phase difference pixel may decrease. Therefore, by forming the opening filter OF in the special pixel region where the special pixel green filter SGF is not formed, it is possible to suppress a decrease in the sensitivity of the image plane phase difference pixel.

Note that the pixel signal obtained by photoelectrically converting the light received by the special pixel 4 corresponding to the special color filter SCF may be used, for example, for correction of a captured image. When a part of the normal pixels 3 is replaced with the special pixels 4, the number of pixels of the normal pixels 3 decreases, and the image quality of the captured image deteriorates. By correcting the captured image using the special pixels 4 corresponding to the special color filter SCF, it is possible to suppress deterioration in image quality of the captured image while realizing functions such as autofocus.

Note that although FIG. 19 illustrates the opening filter OF that shields light on the left side of the special pixel 4, the opening filter OF that shields light on the right side is also formed in the color filter layer CL5 although not illustrated. In addition, the arrangement of the opening filters OF illustrated in FIG. 19 is an example, and the present invention is not limited to this. For example, the opening filter OF that shields light on the left side of the special pixel 4 and the opening filter OF that shields light on the right side may be formed in the same pixel row.

3.3. Third Modification

Figure 20:
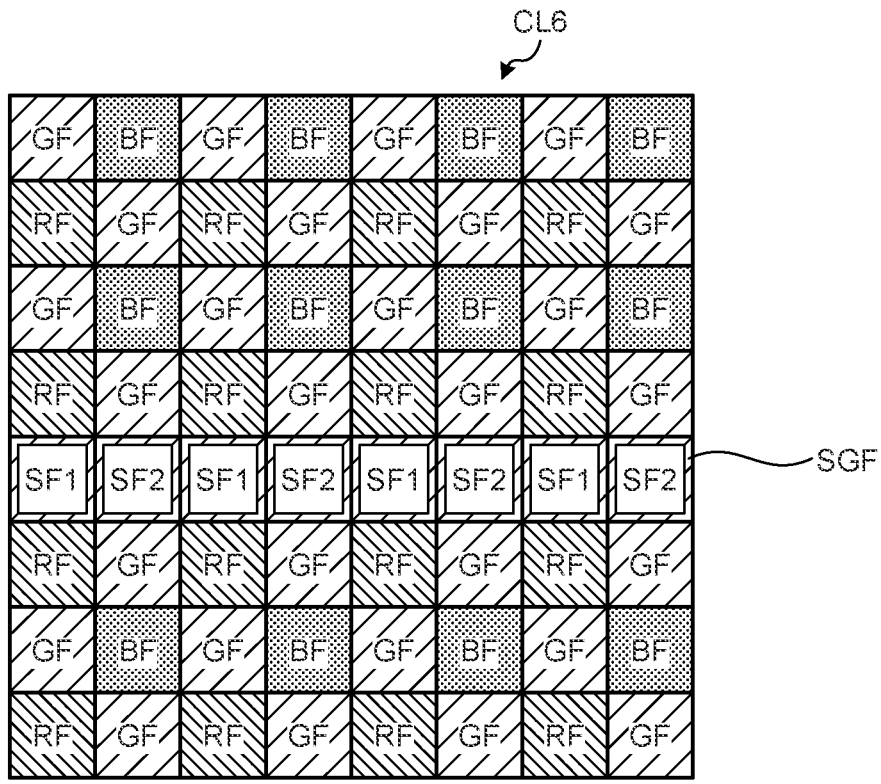
FIG. 20 is a diagram illustrating a configuration example of a color filter layer according to a third modification of the embodiment.

In the above-described embodiment, the first special filter SF1 surrounded by the special pixel green filter SGF and the second special filter SF2 not surrounded by the special pixel green filter SGF are alternately arranged, but the present invention is not limited to this. For example, as illustrated in FIG. 20, all the special filters SF may be surrounded by the special pixel green filter SGF. Note that FIG. 20 is a diagram illustrating a configuration example of a color filter layer CL6 according to a third modification of the embodiment. Note that FIG. 20 illustrates a part of the color filter layer CL6 of the imaging device 1.

As illustrated in FIG. 20, even if all the special filters SF are surrounded by the special pixel green filter SGF, the same effects as those of the embodiment can be obtained. Note that although the area of the special filter SF is reduced, but all the special filters SF have substantially the same area. Therefore, by surrounding all the special filters SF with the special pixel green filter SGF, the sensitivity of the special pixels 4 can be made uniform.

Figure 21:
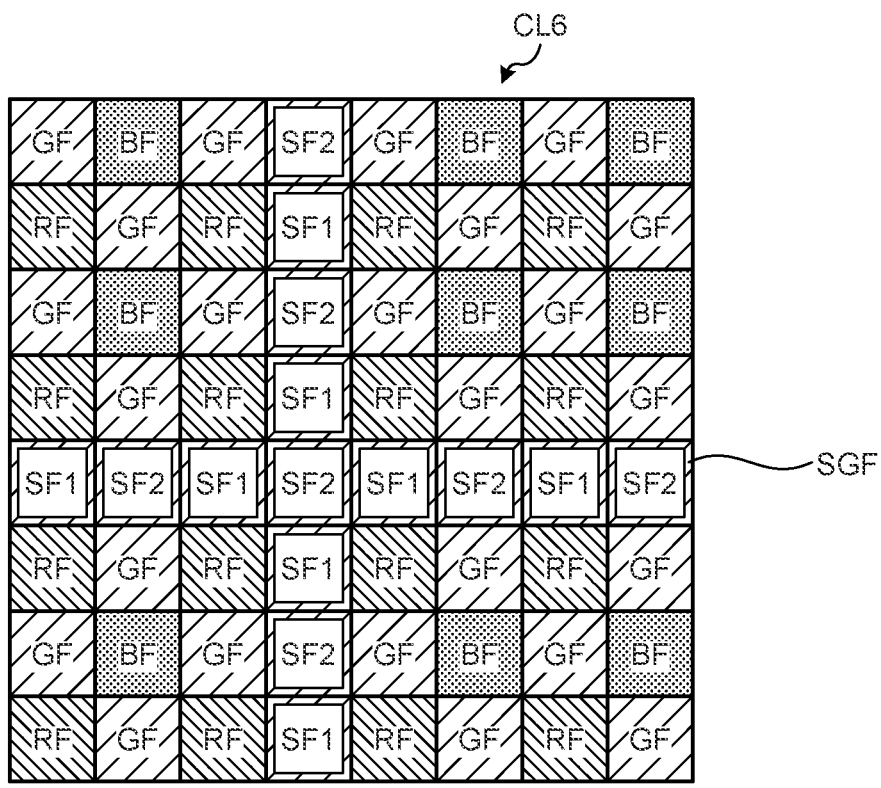
FIG. 21 is a diagram illustrating another configuration example of the color filter layer according to the third modification of the embodiment.

Note that, although FIG. 20 illustrates an example in which the special filters SF are arranged in the pixel row of the color filter layer CL6, as illustrated in FIG. 21, the special filters SF may also be arranged in the pixel column in addition to the pixel row of the color filter layer CL6. Alternatively, the special filters SF may be arranged in the pixel column of the color filter layer CL6. Note that FIG. 21 is a diagram illustrating another configuration example of the color filter layer CL6 according to the third modification of the embodiment, and illustrates a part of the color filter layer CL6 of the imaging device 1.

3.4. Fourth Modification

In the above-described embodiment, the special pixel green filter SGF is arranged to surround the periphery of the special filter SF corresponding to one special pixel 4, but the present invention is not limited to this. For example, the special pixel green filter SGF may be arranged to surround the periphery of the special filter SF corresponding to two or more special pixels 4. In other words, in a color filter layer CL7 according to the third modification, the periphery of the special filter region including two or more special filters SF in plan view may be surrounded by the special pixel green filter SGF.

Figure 22:
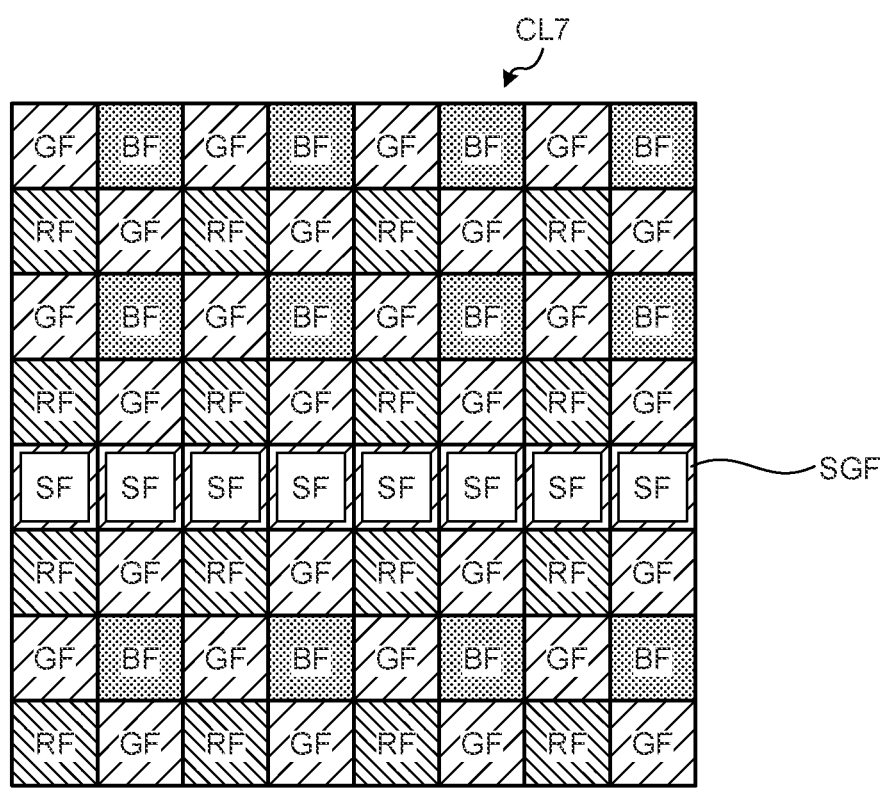
FIG. 22 is a diagram illustrating a configuration example of a color filter layer according to a fourth modification of the embodiment.

FIG. 22 is a diagram illustrating a configuration example of the color filter layer CL7 according to a fourth modification of the embodiment. FIG. 22 illustrates a part of the color filter layer CL7 of the imaging device 1.

As illustrated in FIG. 22, in the color filter layer CL7, the periphery of the special filter region including two special filters SF in plan view in the special pixel row is surrounded by the special pixel green filter SGF.

Figure 23:
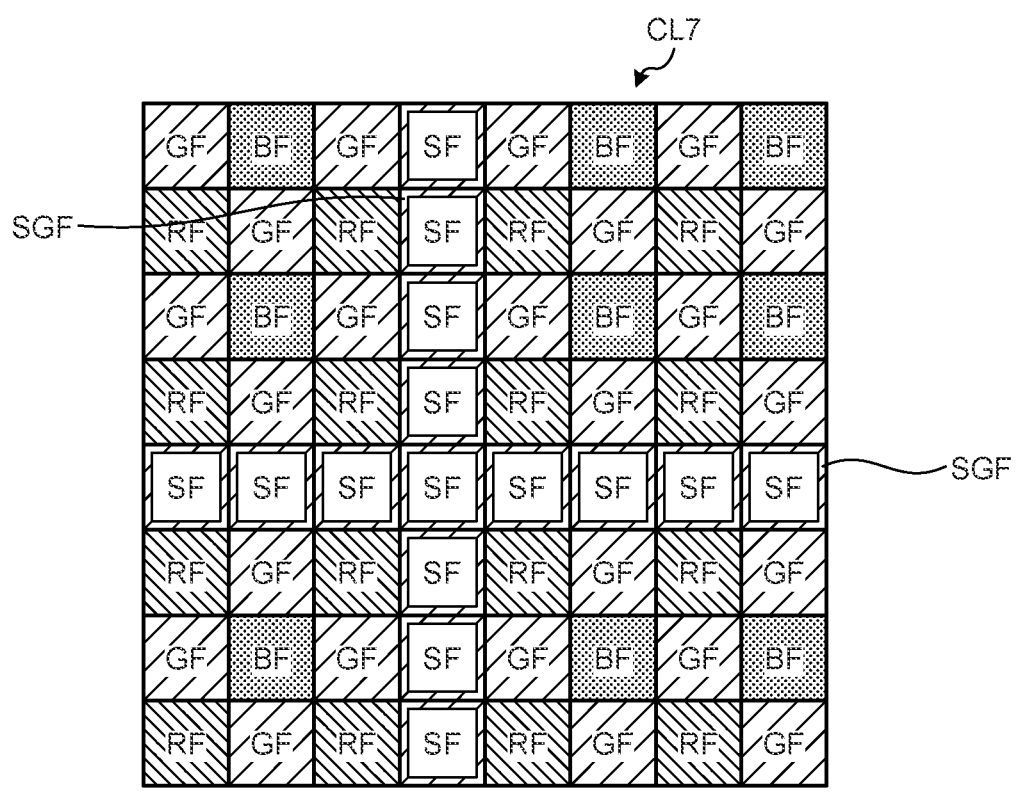
FIG. 23 is a diagram illustrating another configuration example of the color filter layer according to the fourth modification of the embodiment.

Note that, although FIG. 22 illustrates an example in which the special filters SF are arranged in the pixel row of the color filter layer CL7, as illustrated in FIG. 23, the special filters SF may also be arranged in the pixel column in addition to the pixel row of the color filter layer CL7. Alternatively, the special filters SF may be arranged in the pixel column of the color filter layer CL7. Note that FIG. 23 is a diagram illustrating another configuration example of the color filter layer CL7 according to the fourth modification of the embodiment, and illustrates a part of the color filter layer CL7 of the imaging device 1.

3.5. Fifth Modification

Figure 24:
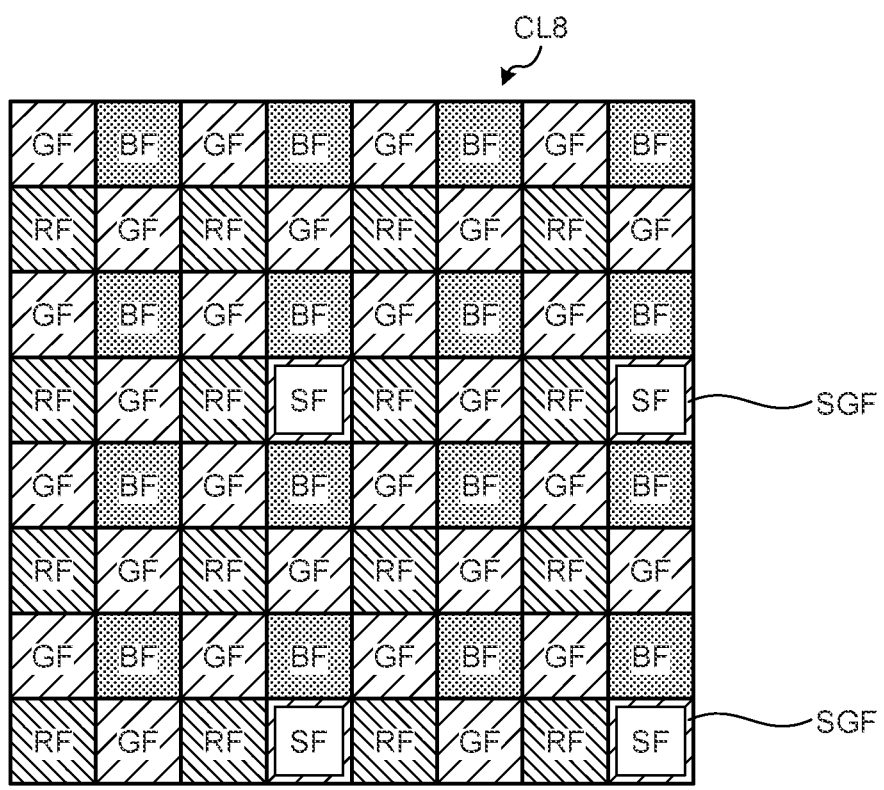
FIG. 24 is a diagram illustrating a configuration example of the color filter layer according to the fourth modification of the embodiment.

In the above-described embodiment, the case where the special filters SF are arranged in the pixel row or the pixel column of the color filter layer has been described, but the present invention is not limited to this. For example, as illustrated in FIG. 24, a part of the color filter CF may be replaced with the special filter SF. FIG. 24 is a diagram illustrating a configuration example of a color filter layer CL8 according to the fourth modification of the embodiment. FIG. 24 illustrates a part of the color filter layer CL8 of the imaging device 1.

In the color filter layer CL8 illustrated in FIG. 24, the green filter GF is replaced with the special filter SF at predetermined intervals, and the special pixel green filter SGF is arranged to surround the periphery of the special filter SF. In this manner, the normal pixels 3 may be replaced with the special pixels 4 at predetermined intervals.

4. ADAPTATION EXAMPLE

Figure 25:
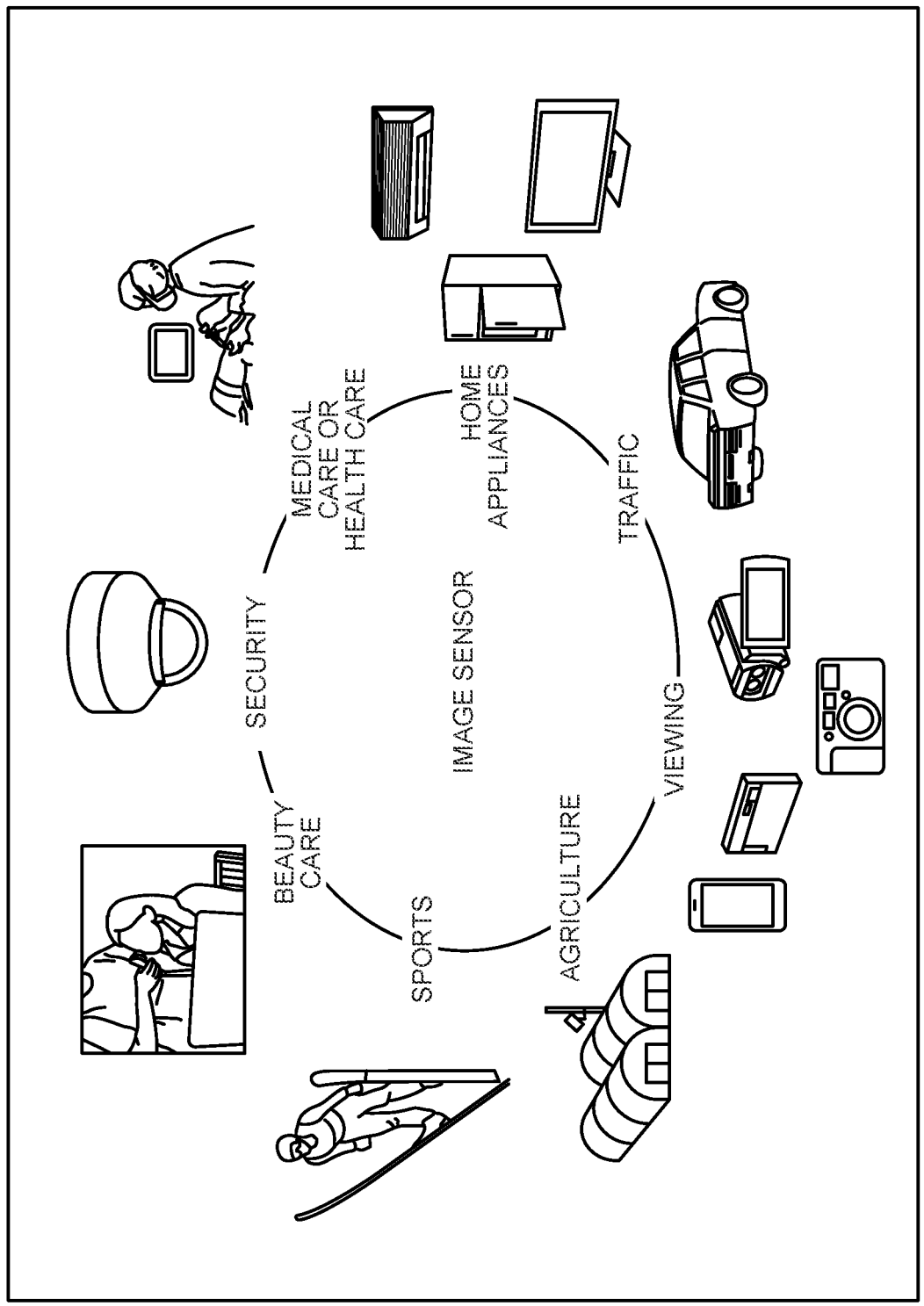
FIG. 25 is a diagram illustrating examples of using the imaging device according to the embodiment and the modifications.

Next, application examples of the imaging device 1 according to the embodiment and the modifications will be described in the present disclosure. FIG. 25 is a diagram illustrating examples of using the imaging device 1 according to the embodiment and the modifications described above.

Each imaging device 1 described above can be used, for example, in various cases of sensing light such as visible light, infrared light, ultraviolet light, and X-rays as described below.

- A device that captures images used for viewing, such as a digital camera or a portable device with a camera function.
- A device used for traffic, such as an in-vehicle sensor that captures images of the front, rear, periphery, inside, and the like of an automobile for safe driving such as automatic stop, recognition of a driver's condition, and the like, a monitoring camera that monitors traveling vehicles and roads, and a distance measuring sensor that measures a distance between vehicles and the like.
- A device used for home appliances such as a TV, a refrigerator, and an air conditioner in order to capture an image of a gesture of a user and operate the device according to the gesture.
- A device used for medical care or health care, such as an endoscope or a device that performs angiography by receiving infrared light.
- A device used for security, such as a monitoring camera for crime prevention or a camera for person authentication.
- A device used for beauty care, such as a skin measuring instrument for capturing images of skin or a microscope for capturing images of a scalp.
- An apparatus used for sports, such as an action camera or a wearable camera for sports or the like.
- A device used for agriculture, such as a camera for monitoring conditions of fields and crops.

Further Application Examples of Technology According to Present Disclosure

The technology according to the present disclosure (the present technology) can be applied to various products. For example, the technology according to the present disclosure may be applied to an endoscopic surgery system.
(Application Example to In-Vivo Information Acquisition System)

Figure 26:
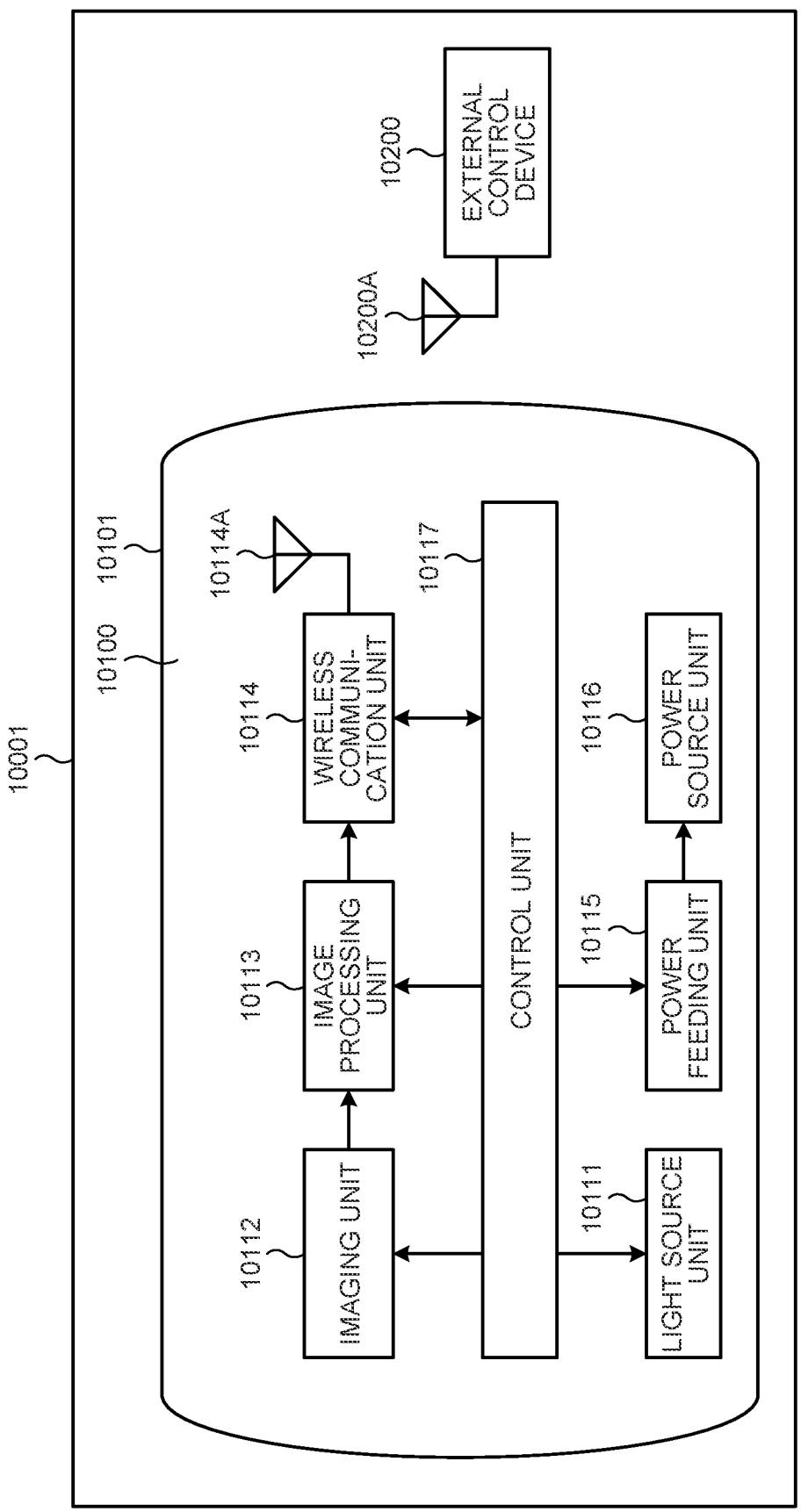
FIG. 26 is a block diagram illustrating an example of a schematic configuration of a patient in-vivo information acquisition system using a capsule endoscope to which the technology according to the present disclosure may be applied.

FIG. 26 is a block diagram illustrating an example of a schematic configuration of a patient in-vivo information acquisition system using a capsule endoscope to which the technology according to the present disclosure (present technology) may be applied.

An in-vivo information acquisition system 10001 includes a capsule endoscope 10100 and an external control device 10200.

The capsule endoscope 10100 is swallowed by the patient at the time of examination. The capsule endoscope 10100 has an imaging function and a wireless communication function, sequentially captures images of the inside of organs (hereinafter, it is also referred to as in-vivo images) at predetermined intervals while moving inside the organs such as the stomach and the intestines by peristaltic movement or the like until being naturally discharged from the patient, and sequentially wirelessly transmits information regarding the in-vivo images to the external control device 10200 outside the body.

The external control device 10200 integrally controls the operation of the in-vivo information acquisition system 10001. In addition, the external control device 10200 receives the information regarding the in-vivo image transmitted from the capsule endoscope 10100, and generates image data for displaying the in-vivo image on a display device (not illustrated) based on the received information regarding the in-vivo image.

In this manner, the in-vivo information acquisition system 10001 can obtain an in-vivo image obtained by imaging the state of the inside of the patient's body at any time from when the capsule endoscope 10100 is swallowed until the capsule endoscope is discharged.

Configurations and functions of the capsule endoscope 10100 and the external control device 10200 will be described in more detail.

The capsule endoscope 10100 includes a casing 10101 of capsule type, and a light source unit 10111, an imaging unit 10112, an image processing unit 10113, a wireless communication unit 10114, a power feeding unit 10115, a power source unit 10116, and a control unit 10117 are housed in the casing 10101.

The light source unit 10111 includes a light source such as a light emitting diode (LED), for example, and irradiates an imaging field of view of the imaging unit 10112 with light.

The imaging unit 10112 includes an imaging device and an optical system including a plurality of lenses provided in front of the imaging device. Reflected light (hereinafter, referred to as observation light) of light with which a body tissue to be observed is irradiated is condensed by the optical system and enters the imaging device. In the imaging unit 10112, the observation light that entered the imaging device is photoelectrically converted, and an image signal corresponding to the observation light is generated in the imaging device. The image signal generated by the imaging unit 10112 is provided to the image processing unit 10113.

The image processing unit 10113 includes a processor such as a CPU or a graphics processing unit (GPU), and performs various types of signal processing on the image signal generated by the imaging unit 10112. The image processing unit 10113 provides the image signal subjected to the signal processing to the wireless communication unit 10114 as RAW data.

The wireless communication unit 10114 performs predetermined processing such as modulation processing on the image signal subjected to the signal processing by the image processing unit 10113, and transmits the image signal to the external control device 10200 via an antenna 10114A. In addition, the wireless communication unit 10114 receives a control signal related to drive control of the capsule endoscope 10100 from the external control device 10200 via the antenna 10114A. The wireless communication unit 10114 provides the control unit 10117 with a control signal received from the external control device 10200.

The power feeding unit 10115 includes a power receiving antenna coil, a power regeneration circuit that regenerates power from current generated in the antenna coil, a booster circuit, and the like. In the power feeding unit 10115, power is generated using a so-called non-contact charging principle.

The power source unit 10116 includes a secondary battery, and stores the electric power generated by the power feeding unit 10115. In FIG. 26, in order to avoid complication of the drawing, illustration of an arrow or the like indicating the destination of power feeding from the power source unit 10116 is omitted, but the power stored in the power source unit 10116 is supplied to the light source unit 10111, the imaging unit 10112, the image processing unit 10113, the wireless communication unit 10114, and the control unit 10117, and may be used for driving these units.

The control unit 10117 includes a processor such as a CPU, and appropriately controls driving of the light source unit 10111, the imaging unit 10112, the image processing unit 10113, the wireless communication unit 10114, and the power feeding unit 10115 according to a control signal transmitted from the external control device 10200.

The external control device 10200 includes a processor such as a CPU or a GPU, or a microcomputer, a control board, or the like on which a processor and a storage element such as a memory are mixedly mounted. The external control device 10200 controls the operation of the capsule endoscope 10100 by transmitting a control signal to the control unit 10117 of the capsule endoscope 10100 via an antenna 10200A. In the capsule endoscope 10100, for example, the light irradiation condition for the observation target in the light source unit 10111 may be changed by the control signal from the external control device 10200. In addition, imaging conditions (for example, a frame rate, an exposure value, and the like in the imaging unit 10112) may be changed by the control signal from the external control device 10200. In addition, the contents of the processing in the image processing unit 10113 and the conditions (for example, a transmission interval, the number of transmitted images, and the like) under which the wireless communication unit 10114 transmits the image signal may be changed by the control signal from the external control device 10200.

In addition, the external control device 10200 performs various types of image processing on the image signal transmitted from the capsule endoscope 10100, and generates image data for displaying the imaged in-vivo image on the display device. As the image processing, for example, various types of signal processing such as development processing (demosaic processing), high image quality processing (band emphasis processing, super-resolution processing, noise reduction processing, camera shake correction processing, and the like), and enlargement processing (electronic zoom processing) can be performed alone or in combination. The external control device 10200 controls driving of the display device to display the imaged in-vivo image based on the generated image data. Alternatively, the external control device 10200 may cause a recording device (not illustrated) to record the generated image data or cause a printing device (not illustrated) to print out the generated image data.

An example of the in-vivo information acquisition system to which the technology according to the present disclosure may be applied has been described above. The technology according to the present disclosure may be applied to, for example, the imaging unit 10112 among the above-described configurations. By applying the imaging device 1 according to the present disclosure to the imaging unit 10112, favorable autofocus can be performed even in a case where zooming or the like is performed, and a higher-quality in-vivo image or the like can be acquired.

(Application Example to Endoscopic Surgery System)

Figure 27:
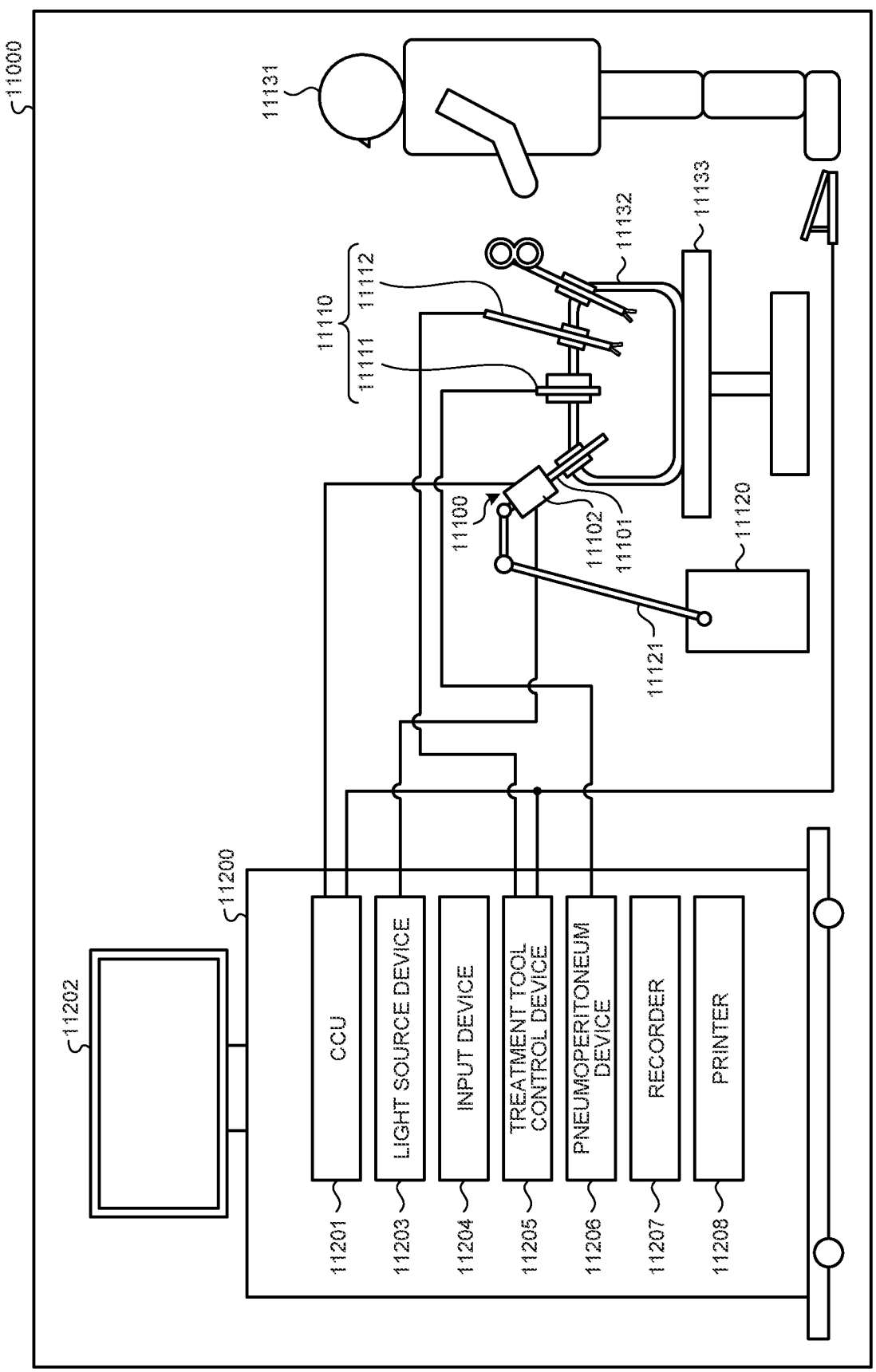
FIG. 27 is a diagram illustrating an example of a schematic configuration of an endoscopic surgery system to which the technology according to the present disclosure may be applied.

The technology according to the present disclosure may be further applied to an endoscopic surgery system. FIG. 27 is a diagram illustrating an example of a schematic configuration of an endoscopic surgery system to which the technology according to the present disclosure (present technology) may be applied.

FIG. 27 illustrates a state in which an operator (doctor) 11131 is performing surgery on a patient 11132 on a patient bed 11133 using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 having region of a predetermined length from the distal end is inserted into the body cavity of the patient 11132, and a camera head 11102 connected to the proximal end of the lens barrel 11101. In the illustrated example, the endoscope 11100 configured as a so-called rigid scope having the rigid lens barrel 11101 is illustrated, but the endoscope 11100 may be configured as a so-called flexible scope having a flexible lens barrel.

An opening portion into which an objective lens is fitted is provided at the distal end of the lens barrel 11101. A light source device 11203 is connected to the endoscope 11100, and light generated by the light source device 11203 is guided to the distal end of the lens barrel by a light guide extending inside the lens barrel 11101, and is emitted toward an observation target in the body cavity of the patient 11132 via the objective lens. Note that the endoscope 11100 may be a forward-viewing endoscope, an oblique-viewing endoscope, or a side-viewing endoscope.

An optical system and an imaging device are provided inside the camera head 11102, and reflected light (observation light) from the observation target is condensed on the imaging device by the optical system. The observation light is photoelectrically converted by the imaging device, and an electric signal corresponding to the observation light, that is, an image signal corresponding to the observation image is generated. The image signal is transmitted to a camera control unit (CCU) 11201 as RAW data.

The CCU 11201 includes a CPU, a GPU, and the like, and integrally controls operations of the endoscope 11100 and a display device 11202. Further, the CCU 11201 receives an image signal from the camera head 11102, and performs various types of image processing for displaying an image based on the image signal, such as development processing (demosaic processing), on the image signal.

The display device 11202 displays an image based on the image signal subjected to the image processing by the CCU 11201 under the control of the CCU 11201.

The light source device 11203 includes a light source such as a light emitting diode (LED), for example, and supplies irradiation light for capturing an image of a surgical site or the like to the endoscope 11100.

An input device 11204 is an input interface for the endoscopic surgery system 11000. The user can input various types of information and instructions to the endoscopic surgery system 11000 via the input device 11204. For example, the user inputs an instruction or the like to change imaging conditions (type of irradiation light, magnification, focal length, and the like) by the endoscope 11100.

A treatment tool control device 11205 controls driving of the energy treatment tool 11112 for cauterization and incision of tissue, sealing of a blood vessel, or the like. A pneumoperitoneum device 11206 feeds gas into the body cavity of the patient 11132 via the pneumoperitoneum tube 11111 in order to inflate the body cavity for the purpose of securing a visual field by the endoscope 11100 and securing a working space of the operator. A recorder 11207 is a device capable of recording various types of information regarding surgery. A printer 11208 is a device capable of printing various types of information regarding surgery in various formats such as text, image, or graph.

Note that the light source device 11203 that supplies the endoscope 11100 with the irradiation light at the time of capturing a picture the surgical site can include, for example, an LED, a laser light source, or a white light source including a combination of them. In a case where the white light source includes a combination of RGB laser light sources, since the output intensity and the output timing of each color (each wavelength) can be controlled with high accuracy, adjustment of the white balance of the captured image can be performed in the light source device 11203.

In addition, the driving of the light source device 11203 may be controlled to change the intensity of light to be output every predetermined time. By controlling the driving of the imaging device of the camera head 11102 in synchronization with the timing of the change of the intensity of the light to acquire images in a time division manner and synthesizing the images, it is possible to generate an image of a high dynamic range without so-called blocked up shadows and blown out highlights.

In addition, the light source device 11203 may be configured to be able to supply light in a predetermined wavelength band corresponding to special light observation. In the special light observation, for example, so-called narrow band imaging is performed in which a predetermined tissue such as a blood vessel in a mucosal surface layer is imaged with high contrast by emitting light in a narrower band than irradiation light (that is, white light) at the time of normal observation using wavelength dependency of light absorption in body tissue. Alternatively, in the special light observation, fluorescence observation for obtaining an image by fluorescence generated by irradiation with excitation light may be performed. In the fluorescence observation, it is possible to irradiate body tissue with excitation light and observe fluorescence from the body tissue (autofluorescence observation), or to locally inject a reagent such as indocyanine green (ICG) into body tissue and irradiate the body tissue with excitation light corresponding to a fluorescence wavelength of the reagent to obtain a fluorescent image, for example. The light source device 11203 may be configured to be able to supply narrowband light and/or excitation light corresponding to such special light observation.

Figure 28:
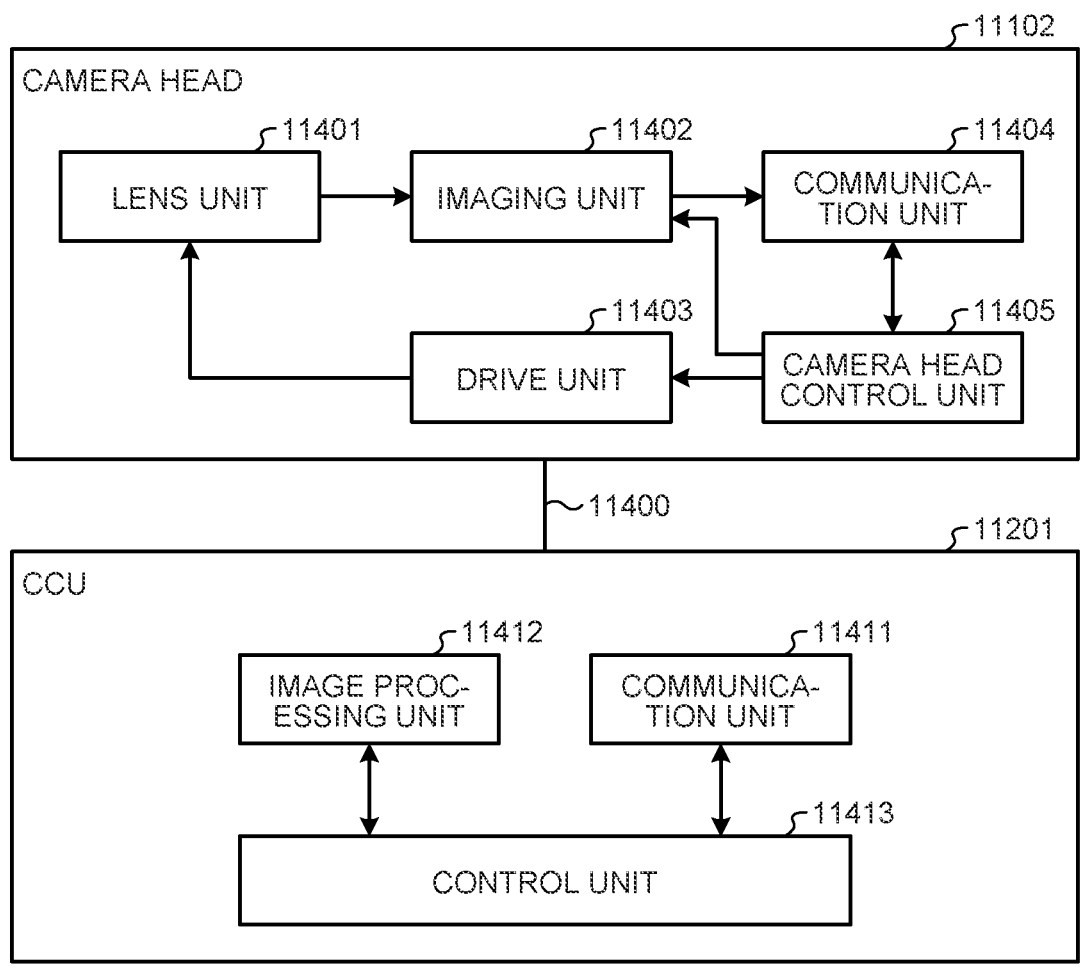
FIG. 28 is a block diagram illustrating an example of functional configurations of a camera head and a CCU.

FIG. 28 is a block diagram illustrating an example of functional configurations of the camera head 11102 and the CCU 11201 illustrated in FIG. 27.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. Observation light taken in from the distal end of the lens barrel 11101 is guided to the camera head 11102 and enters the lens unit 11401. The lens unit 11401 includes a combination of a plurality of lenses including a zoom lens and a focus lens.

The imaging unit 11402 includes an imaging device. The number of imaging devices forming the imaging unit 11402 may be one (so-called single-plate type) or a plurality of (so-called multi-plate type) imaging devices. In a case where the imaging unit 11402 is a multi-plate type, for example, image signals corresponding to RGB may be generated by the imaging devices, and a color image may be obtained by combining the image signals. Alternatively, the imaging unit 11402 may include a pair of imaging devices for acquiring right-eye and left-eye image signals corresponding to three-dimensional (3D) display. By performing 3D display, the operator 11131 can more accurately grasp the depth of the living tissue in the surgical site. Note that, in a case where the imaging unit 11402 is a multi-plate type, a plurality of systems of lens units 11401 may be provided corresponding to imaging devices.

In addition, the imaging unit 11402 is not necessarily provided in the camera head 11102. For example, the imaging unit 11402 may be provided immediately after the objective lens inside the lens barrel 11101.

The drive unit 11403 includes an actuator, and moves the zoom lens and the focus lens of the lens unit 11401 by a predetermined distance along the optical axis under the control of the camera head control unit 11405. As a result, the magnification and focus of the captured image by the imaging unit 11402 may be appropriately adjusted.

The communication unit 11404 includes a communication device for transmitting and receiving various types of information to and from the CCU 11201. The communication unit 11404 transmits the image signal obtained from the imaging unit 11402 as RAW data to the CCU 11201 via the transmission cable 11400.

In addition, the communication unit 11404 receives a control signal for controlling driving of the camera head 11102 from the CCU 11201, and supplies the control signal to the camera head control unit 11405. The control signal includes, for example, information regarding imaging conditions such as information for specifying a frame rate of a captured image, information for specifying an exposure value at the time of imaging, and/or information for specifying a magnification and a focus of a captured image.

Note that the imaging conditions such as the frame rate, the exposure value, the magnification, and the focus may be appropriately specified by the user, or may be automatically set by the control unit 11413 of the CCU 11201 based on the acquired image signal. In the latter case, a so-called auto exposure (AE) function, an auto focus (AF) function, and an auto white balance (AWB) function are installed in the endoscope 11100.

The camera head control unit 11405 controls driving of the camera head 11102 based on the control signal from the CCU 11201 received via the communication unit 11404.

The communication unit 11411 includes a communication device for transmitting and receiving various types of information to and from the camera head 11102. The communication unit 11411 receives an image signal transmitted from the camera head 11102 via the transmission cable 11400.

In addition, the communication unit 11411 transmits a control signal for controlling driving of the camera head

11102 to the camera head 11102. The image signal and the control signal can be transmitted by electric communication, optical communication, or the like.

The image processing unit 11412 performs various types of image processing on the image signal that is RAW data transmitted from the camera head 11102.

The control unit 11413 performs various types of control related to imaging of a surgical site or the like by the endoscope 11100 and display of a captured image obtained by imaging of the surgical site or the like. For example, the control unit 11413 generates a control signal for controlling driving of the camera head 11102.

In addition, the control unit 11413 causes the display device 11202 to display a captured image of a surgical site or the like based on the image signal subjected to the image processing by the image processing unit 11412. At this time, the control unit 11413 may recognize various objects in the captured image using various image recognition technologies. For example, the control unit 11413 can recognize a surgical tool such as forceps, a specific body part, bleeding, mist at the time of using the energy treatment tool 11112, and the like by detecting the shape, color, and the like of the edge of the object included in the captured image. When displaying the captured image on the display device 11202, the control unit 11413 may superimpose and display various types of surgery support information on the image of the surgical site by using the recognition result. Since the surgery support information is superimposed and displayed and presented to the operator 11131, the burden on the operator 11131 can be reduced and the operator 11131 can reliably proceed with the surgery.

The transmission cable 11400 connecting the camera head 11102 and the CCU 11201 is an electric signal cable compatible with electric signal communication, an optical fiber compatible with optical communication, or a composite cable of them.

Here, in the example of FIG. 28, wired communication is performed using the transmission cable 11400, but communication between the camera head 11102 and the CCU 11201 may be performed wirelessly.

An example of the endoscopic surgery system to which the technology according to the present disclosure may be applied has been described above. The technology according to the present disclosure may be applied to, for example, the endoscope 11100 and the imaging unit 11402 of the camera head 11102 among the above-described configurations. By applying the imaging device 1 according to the present disclosure to the imaging unit 11402, favorable autofocus can be performed even in a case where zooming or the like is performed, and a higher-quality captured image or the like can be acquired. As a result, the burden on the operator 11131 can be reduced, and the operator 11131 can reliably proceed with the surgery.

Note that, here, the endoscopic surgery system has been described as an example, but the technology according to the present disclosure may be applied to, for example, a microscopic surgery system or the like.

(Application Example to Moving Body)

The technology according to the present disclosure may be further applied to devices mounted on various moving bodies such as an m-automobile, an electric car, a hybrid electric car, a motorcycle, a bicycle, a personal mobility, an airplane, a drone, a ship, and a robot.

Figure 29:
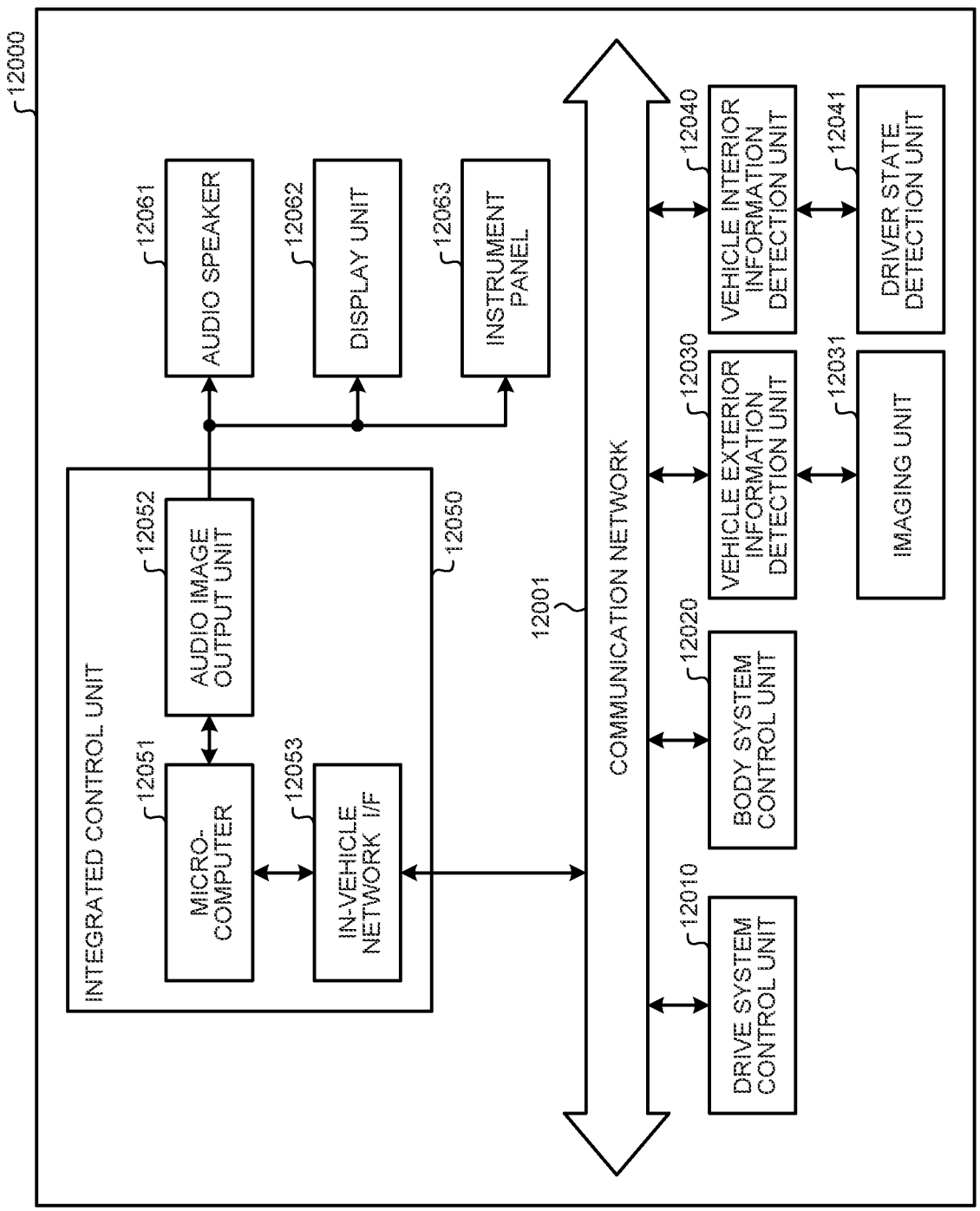
FIG. 29 is a block diagram illustrating a schematic configuration example of a vehicle control system that is an example of a moving body control system to which the technology according to the present disclosure may be applied.

FIG. 29 is a block diagram illustrating a schematic configuration example of a vehicle control system that is an example of a moving body control system to which the technology according to the present disclosure may be applied.

A vehicle control system 12000 includes a plurality of electronic control units connected via a communication network 12001. In the example illustrated in FIG. 29, the vehicle control system 12000 includes a drive system control unit 12010, a body system control unit 12020, a vehicle exterior information detection unit 12030, a vehicle interior information detection unit 12040, and an integrated control unit 12050. In addition, as a functional configuration of the integrated control unit 12050, a microcomputer 12051, an audio image output unit 12052, and an in-vehicle network interface (I/F) 12053 are illustrated.

The drive system control unit 12010 controls the operation of devices related to the drive system of the vehicle according to various programs. For example, the drive system control unit 12010 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls operations of various devices mounted on the vehicle body according to various programs. For example, the body system control unit 12020 functions as a control device of a keyless entry system, a smart key system, a power window device, or various lamps such as a head lamp, a back lamp, a brake lamp, a blinker, or a fog lamp. In this case, radio waves transmitted from a portable device that substitutes for a key or signals of various switches may be input to the body system control unit 12020. The body system control unit 12020 receives input of these radio waves or signals, and controls a door lock device, a power window device, a lamp, and the like of the vehicle.

The vehicle exterior information detection unit 12030 detects information outside the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle, and receives the captured image. The vehicle exterior information detection unit 12030 may perform object detection processing or distance detection processing of a person, a vehicle, an obstacle, a sign, a character on a road surface, or the like based on the received image. For example, the vehicle exterior information detection unit 12030 performs image processing on the received image, and performs object detection processing and distance detection processing based on a result of the image processing.

The imaging unit 12031 is an optical sensor that receives light and outputs an electric signal corresponding to the amount of received light. The imaging unit 12031 can output the electric signal as an image or can output the electric signal as distance measurement information. In addition, the light received by the imaging unit 12031 may be visible light or invisible light such as infrared rays.

The vehicle interior information detection unit 12040 detects information inside the vehicle. For example, a driver state detection unit 12041 that detects a state of a driver is connected to the vehicle interior information detection unit 12040. The driver state detection unit 12041 includes, for example, a camera that images the driver, and the vehicle interior information detection unit 12040 may calculate the degree of fatigue or the degree of concentration of the driver or may determine whether or not the driver is dozing off based on the detection information input from the driver state detection unit 12041.

The microcomputer 12051 can calculate a control target value of the driving force generation device, the steering mechanism, or the braking device based on the information inside and outside the vehicle acquired by the vehicle exterior information detection unit 12030 or the vehicle interior information detection unit 12040, and output a control command to the drive system control unit 12010. For example, the microcomputer 12051 can perform cooperative control for the purpose of realizing functions of an advanced driver assistance system (ADAS) including collision avoidance or impact mitigation of the vehicle, follow-up traveling based on the distance between vehicles, vehicle speed maintenance traveling, vehicle collision warning, vehicle lane departure warning, or the like.

In addition, the microcomputer 12051 controls the driving force generation device, the steering mechanism, the braking device, or the like based on the information around the vehicle acquired by the vehicle exterior information detection unit 12030 or the vehicle interior information detection unit 12040, performing cooperative control for the purpose of automatic driving or the like in which the vehicle autonomously travels without depending on the operation of the driver.

In addition, the microcomputer 12051 can output a control command to the body system control unit 12020 based on the vehicle exterior information acquired by the vehicle exterior information detection unit 12030. For example, the microcomputer 12051 can perform cooperative control for the purpose of preventing the glare, such as switching from a high beam to a low beam, by controlling the headlamp according to the position of a preceding vehicle or an oncoming vehicle detected by the vehicle exterior information detection unit 12030.

The audio image output unit 12052 transmits an output signal of at least one of audio and an image to an output device capable of visually or audibly notifying an occupant of the vehicle or the outside of the vehicle of the information. In the example of FIG. 29, an audio speaker 12061, a display unit 12062, and an instrument panel 12063 are illustrated as the output device. The display unit 12062 may include, for example, at least one of an on-board display and a head-up display.

Figure 30:
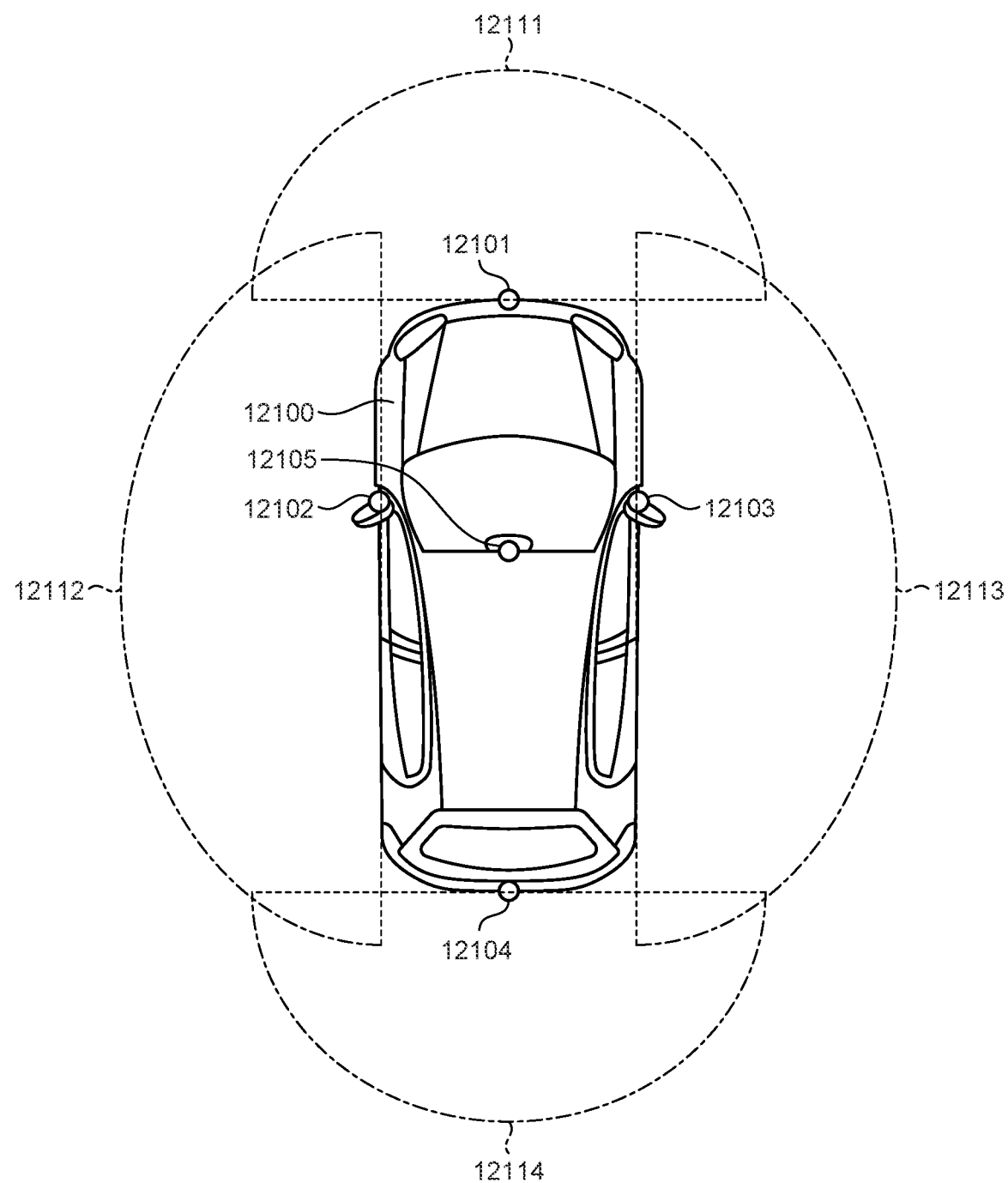
FIG. 30 is a diagram illustrating an example of an installation position of an imaging unit.

FIG. 30 is a diagram illustrating an example of an installation position of the imaging unit 12031. In FIG. 30, a vehicle 12100 includes imaging units 12101, 12102, 12103, 12104, and 12105 as the imaging unit 12031.

The imaging units 12101, 12102, 12103, 12104, and 12105 are provided, for example, at positions such as a front nose, a side mirror, a rear bumper, a back door, and an upper portion of a windshield in a vehicle interior of the vehicle 12100. The imaging unit 12101 provided at the front nose and the imaging unit 12105 provided at the upper portion of a windshield in a vehicle interior mainly acquire images in front of the vehicle 12100. The imaging units 12102 and 12103 provided at the side mirrors mainly acquire images of the sides of the vehicle 12100. The imaging unit 12104 provided on the rear bumper or the back door mainly acquires an image behind the vehicle 12100. The front images acquired by the imaging units 12101 and 12105 are mainly used for detecting a preceding vehicle, a pedestrian, an obstacle, a traffic light, a traffic sign, a lane, or the like.

Note that FIG. 30 illustrates an example of an imaging range of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 provided at the side mirrors, respectively, and an imaging range 12114 indicates an imaging range of the imaging unit 12104 provided at the rear bumper or the back door. For example, an overhead image of the vehicle 12100 viewed from above can be obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging devices, or may be an imaging device having pixels for phase difference detection.

For example, the microcomputer 12051 obtains a distance to each three-dimensional object in the imaging ranges 12111 to 12114 and a temporal change of the distance (relative speed with respect to the vehicle 12100) based on the distance information obtained from the imaging units 12101 to 12104, extracting, as a preceding vehicle, a three-dimensional object traveling at a predetermined speed (for example, 0 km/h or more) in substantially the same direction as the vehicle 12100, in particular, the closest three-dimensional object on a traveling path of the vehicle 12100. Further, the microcomputer 12051 can set the distance between vehicles to be secured in advance in front of the preceding vehicle, and can perform automatic brake control (including follow-up stop control), automatic acceleration control (including follow-up start control), and the like. As described above, it is possible to perform cooperative control for the purpose of automatic driving or the like in which the vehicle autonomously travels without depending on the operation of the driver.

For example, based on the distance information obtained from the imaging units 12101 to 12104, the microcomputer 12051 can classify three-dimensional object data related to a three-dimensional object into a two-wheeled vehicle, an ordinary vehicle, a large vehicle, a pedestrian, and other three-dimensional objects such as a utility pole, extract the three-dimensional object data, and use the three-dimensional object data for automatic avoidance of an obstacle. For example, the microcomputer 12051 identifies obstacles around the vehicle 12100 as obstacles that can be visually recognized by the driver of the vehicle 12100 and obstacles that are difficult to visually recognize. Then, the microcomputer 12051 determines a collision risk indicating a risk of collision with each obstacle, and when the collision risk is a set value or more and there is a possibility of collision, the microcomputer 12051 can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is present in images captured by the imaging units 12101 to 12104. Such recognition of a pedestrian is performed by, for example, a procedure of extracting feature points in captured images by the imaging units 12101 to 12104 as an infrared camera and a procedure of performing pattern matching processing on a series of feature points indicating an outline of an object to determine whether or not the object is a pedestrian. When the microcomputer 12051 determines that a pedestrian is present in the images captured by the imaging units 12101 to 12104 and recognizes the pedestrian, the audio image output unit 12052 controls the display unit 12062 to superimpose and display a square contour line for emphasis on the recognized pedestrian. In addition, the audio image output unit 12052 may control the display unit 12062 to display an icon or the like indicating a pedestrian at a desired position.

An example of the vehicle control system to which the technology according to the present disclosure may be applied has been described above. The technology according to the present disclosure may be applied to, for example, the imaging unit 12031 among the above-described configurations. By applying the imaging device 1 according to the present disclosure to the imaging unit 12031, favorable autofocus can be performed even in a case where zooming or the like is performed, and a higher-quality captured image is acquired.

5. SUMMARY

The embodiment and the modifications of the present disclosure have been described in detail above with reference to FIGS. 1 to 30. As described above, the imaging device 1 according to the embodiment and the modifications includes the plurality of normal pixels 3 arranged in a matrix, the special pixel 4 arranged by replacing a part of the normal pixels 3, the color filter CF corresponding to the normal pixels 3 and arranged according to a predetermined rule, the special filter SF arranged corresponding to the special pixel 4, and the special pixel color filter (corresponding to the special pixel green filter SGF) arranged to surround at least a part of the periphery of the special filter SF.

As a result, the color filter CF can be arranged in a manner that the end of the color filter CF is in contact with the special pixel color filter, and the color filter CF can be formed in a desired shape. Therefore, the sensitivity variation of the normal pixels 4 can be suppressed, and the decrease in the imaging accuracy of the imaging device can be suppressed.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

In addition, the effects described in the present specification are merely illustrative or exemplary, and are not restrictive. That is, the technology according to the present disclosure can exhibit other effects obvious to those skilled in the art from the description of the present specification together with or instead of the above effects.

Note that the following configurations also belong to the technical scope of the present disclosure.

(1)
An imaging device comprising:
a plurality of normal pixels arranged in a matrix;
a special pixel arranged by replacing a part of the normal pixels;
a color filter corresponding to the normal pixels and arranged according to a predetermined rule;
a special filter arranged corresponding to the special pixel; and
a special pixel color filter arranged to surround at least a part of a periphery of the special filter.

(2)
The imaging device according to (1), wherein
the color filter includes a plurality of filters that passes through different colors, and
the special pixel color filter is a color filter that passes through a same color as any one of the plurality of filters.

(3)
The imaging device according to (1) or (2), wherein
the special pixel color filter is arranged to be in contact with a corner portion of the color filter that passes through the same color.

(4)
The imaging device according to any one of (1) to (3), wherein
the special pixel color filter is arranged to surround a periphery of the one special filter.

(5)
The imaging device according to (4), wherein
the special pixel color filter is arranged to surround the special filter adjacent to the color filter that passes through a color different from a color passed through by the special pixel color filter.

(6)
The imaging device according to any one of (1) to (3), wherein
the special pixel color filter is arranged to surround the peripheries of the two or more adjacent special filters.

(7)
The imaging device according to any one of (1) to (6), wherein
the special filter is any one of an infrared light filter, an image plane phase difference filter, a white filter, a monochrome filter, and a black filter.

(8)
An electronic apparatus comprising:
an imaging device;
an optical system that forms an image of incident light on a light receiving surface of the imaging device; and
a processor that controls the imaging device, wherein
the imaging device includes:
a plurality of normal pixels arranged in a matrix;
a special pixel arranged by replacing a part of the normal pixels;
a color filter corresponding to the normal pixels and arranged according to a predetermined rule;
a special filter arranged corresponding to the special pixel; and
a special pixel color filter arranged to surround at least a part of a periphery of the special filter.

REFERENCE SIGNS LIST

1 IMAGING DEVICE
3 NORMAL PIXEL
4 SPECIAL PIXEL
31, 41 PHOTOELECTRIC CONVERSION UNIT
32, 42 TRANSFER SWITCH
33, 43 FLOATING DIFFUSION
35, 45 AMPLIFICATION TRANSISTOR
36, 46 ROW SELECTION SWITCH
CF COLOR FILTER
SF SPECIAL FILTER
SGF SPECIAL PIXEL GREEN FILTER

RF RED FILTER
GF GREEN FILTER
BF BLUE FILTER

What is claimed is:

1. An imaging device, comprising:
a plurality of normal pixels arranged in a matrix having a plurality of rows of normal pixels and a plurality of columns of normal pixels;
a plurality of special pixels arranged by replacing some of the normal pixels within the matrix, wherein each special pixel in the plurality of special pixels is next to at least one other special pixel in the plurality of special pixels in at least one of a row or a column direction;
a plurality of normal color filters, wherein one normal color filter in the plurality of normal color filters is provided for each of the normal pixels, and wherein a pattern of colors of the normal color filters is arranged across the matrix of normal pixels according to a predetermined rule;
a plurality of special filters, wherein one special filter in the plurality of special filters is provided for each of the special pixels; and
a plurality of special pixel color filters, wherein at least one special pixel color filter in the plurality of special pixel color filters is arranged along at least a part of a periphery of at least some of the special filters.

2. The imaging device according to claim 1, wherein the plurality of special pixel color filters pass a same color of light as any one of the plurality of color filters.

3. The imaging device according to claim 2, wherein at least one special color filter of the plurality of special pixel color filters is in contact with a corner portion of a normal color filter that passes through light of a same color as the at least one of the special color filters.

4. The imaging device according to claim 3, wherein
at least one special pixel color filter from the plurality of special pixel color filters surrounds a periphery of at least one special filter from the plurality of special filters.

5. The imaging device according to claim 4, wherein
the at least one special pixel color filter surrounds a special filter adjacent to a normal color filter that passes through light of a color different from a color of light passed through by the at least one special pixel color filter.

6. The imaging device according to claim 3, wherein
the at least one special pixel color filter surrounds the peripheries of two or more adjacent special filters.

7. The imaging device according to claim 3, wherein a special filter from the plurality of special filters is any one of an infrared light filter, an image plane phase difference filter, a white filter, a monochrome filter, and a black filter.

8. An electronic apparatus, comprising:
an imaging device;
an optical system that forms an image of incident light on a light receiving surface of the imaging device; and
a processor that controls the imaging device, wherein the imaging device includes:
a plurality of normal pixels arranged in a matrix having a plurality of rows of normal pixels and a plurality of columns of normal pixels;
a plurality of special pixels arranged by replacing some of the normal pixels within the matrix, wherein each special pixel in the plurality of special pixels is next to at least one other special pixel in the plurality of special pixels in at least one of a row or a column direction;
a plurality of normal color filters, wherein one normal color filter in the plurality of normal color filters is provided for each of the normal pixels, and wherein a pattern of colors of the normal color filters is arranged according to a predetermined rule;
a plurality of special filters, wherein one special filter in the plurality of special filters is provided for each of the special pixels; and
a plurality of special pixel color filters, wherein at least one special pixel color filter from the plurality of special pixel color filters is arranged along at least a part of a periphery at least some of the special filters.

9. An imaging device, comprising:
a plurality of pixels arranged in a plurality of rows and a plurality of columns, wherein at least some of the pixels are normal pixels, wherein at least some of the pixels are special pixels, wherein each special pixel in the plurality of special pixels is next to at least one other special pixel in the plurality of special pixels, and wherein at least some of the special pixels are disposed in at least one of a first row of the plurality of rows of pixels or a first column of the plurality of columns of pixels;
a plurality of normal color filters in a one to one relationship with the normal pixels, wherein each normal color filter of the plurality of normal color filters is disposed over a light incident surface side of a corresponding normal pixel of the plurality of normal pixels;
a plurality of special filters, wherein each special filter in the plurality of special filters is disposed over a light incident surface side of a corresponding special pixel of the plurality of special pixels; and
a plurality of special pixel color filters, wherein each special pixel color filter in the plurality of special pixel color filters extends along at least a part of a periphery of at least one special filter of the plurality of special filters.

10. The imaging device according to claim 9, wherein at least some of the pixels are disposed in at least the first row of pixels and the first column of pixels.

11. The imaging device according to claim 9, wherein at least some of the normal color filters are green color filters, wherein at least some of the normal color filters are red color filters, and wherein at some of the normal color filters are blue color filters.

12. The imaging device according to claim 11, wherein the normal color filters form a Bayer array.

13. The imaging device according to claim 11, wherein at least some of the special pixels are disposed in the first row, and wherein the special pixels in the first row are between one row of green and red color filters and another row of green and red color filters.

14. The imaging device according to claim 9, wherein at least some of the special pixels are surrounded by a special pixel color filter.

15. The imaging device according to claim 9, wherein at least some of the special pixels are disposed in the first row of pixels, and wherein every other special pixel in the first row of pixels is surrounded by a special pixel color filter.

16. The imaging device according to claim 9, wherein the special color filters include any one of an infrared light filter, an image plane phase difference filter, a white filter, a monochrome filter, and a black filter.

* * * * *